(12) United States Patent
Kerfoot

(10) Patent No.: US 7,547,388 B2
(45) Date of Patent: Jun. 16, 2009

(54) SUPEROXIDANT POISER FOR GROUNDWATER AND SOIL TREATMENT WITH IN-SITU OXIDATION-REDUCTION AND ACIDITY-BASICITY ADJUSTMENT

(75) Inventor: William B. Kerfoot, Falmouth, MA (US)

(73) Assignee: Think Village-Kerfoot, LLC, Boulder, CO (US)

( * ) Notice: Subject to any disclaimer, the term of this patent is extended or adjusted under 35 U.S.C. 154(b) by 75 days.

(21) Appl. No.: 10/895,015

(22) Filed: Jul. 20, 2004

(65) Prior Publication Data
US 2006/0016763 A1 Jan. 26, 2006

(51) Int. Cl.
C02F 1/70 (2006.01)
C02F 1/78 (2006.01)

(52) U.S. Cl. ............... 210/96.1; 210/143; 210/170.07; 210/192; 210/198.1; 210/416.1; 405/128.5

(58) Field of Classification Search .............. 210/96.1, 210/170.07, 198.1, 199, 220, 739, 746, 747, 210/757–760, 143, 192, 416.1; 405/128.5, 405/128.75
See application file for complete search history.

(56) References Cited

U.S. PATENT DOCUMENTS

| | | |
|---|---|---|
| 4,639,314 A | 1/1987 | Tyer |
| 4,695,447 A | 9/1987 | Shultz |
| 4,696,739 A | 9/1987 | Pedneault |
| 4,966,717 A | 10/1990 | Kern |
| 5,116,163 A | 5/1992 | Bernhardt |
| 5,122,165 A | 6/1992 | Wang et al. |
| 5,180,503 A | 1/1993 | Gorelick et al. |
| 5,205,927 A | 4/1993 | Wickramanayake |
| 5,221,159 A | 6/1993 | Billings et al. |
| 5,227,184 A | 7/1993 | Hurst |
| 5,246,309 A | 9/1993 | Hobby |
| 5,277,518 A | 1/1994 | Billings et al. |
| 5,389,267 A | 2/1995 | Gorelick et al. |

(Continued)

FOREIGN PATENT DOCUMENTS

GB 2005655 A 4/1979

(Continued)

OTHER PUBLICATIONS

"Factors Controlling the Removal of Organic Pollutants in an Ozone Reactor", M.D. Gurol, AWWA 1984 Annual Conference, Dallas, TX, Jun. 10-14, 1984, pp. 2-21.

(Continued)

Primary Examiner—Matthew O Savage
(74) Attorney, Agent, or Firm—Lathrop & Gage LLP

(57) ABSTRACT

Equipment and process by which an operator can set (or program) a time sequence of coatings of oxygen with increasing oxidation potential for in-situ treatment (chemical reaction) of organic compounds ranging from superoxidation (catalyzed ozone) to reduction conditions involving hydrogen sulfide gas is described. The equipment makes use of oxygen in a combination of gaseous and liquid forms to produce microbubbles of, e.g., different composition of oxygen forms possessing peroxides, superoxides, and hydroperoxides with increasing oxidative potential. The oxidative potential of the reactive mixture can be set to more cost-effectively degrade byproducts of contaminant decomposition without reformulation and reinjection. A secondary advantage comes with in-situ adjustment of pH or acidity/basicity.

41 Claims, 17 Drawing Sheets

U.S. PATENT DOCUMENTS

| | | | |
|---|---|---|---|
| 5,425,598 | A | 6/1995 | Pennington |
| 5,451,320 | A | 9/1995 | Wang et al. |
| 5,472,294 | A | 12/1995 | Billings et al. |
| 5,560,737 | A | 10/1996 | Schuring et al. |
| 5,698,092 | A | 12/1997 | Chen |
| 5,833,388 | A | 11/1998 | Edwards et al. |
| 5,851,407 | A | 12/1998 | Bowman et al. |
| 5,855,775 | A | 1/1999 | Kerfoot |
| 5,879,108 | A | 3/1999 | Haddad |
| 5,952,452 | A | 9/1999 | Aerts et al. |
| 5,954,452 | A | 9/1999 | Goldstein |
| 6,007,274 | A | 12/1999 | Suthersan |
| 6,083,407 | A | 7/2000 | Kerfoot |
| 6,217,767 | B1 | 4/2001 | Clark |
| 6,254,310 | B1 | 7/2001 | Suthersan |
| 6,283,674 | B1 | 9/2001 | Suthersan |
| 6,284,143 | B1 | 9/2001 | Kerfoot |
| 6,306,296 | B1 | 10/2001 | Kerfoot |
| 6,312,605 | B1 | 11/2001 | Kerfoot |
| 6,352,387 | B1 | 3/2002 | Briggs et al. |
| 6,391,259 | B1 | 5/2002 | Malkin et al. |
| 6,403,034 | B1 | 6/2002 | Nelson et al. |
| 6,436,285 | B1 | 8/2002 | Kerfoot |
| 6,582,611 | B1 | 6/2003 | Kerfoot |
| 6,596,161 | B2 | 7/2003 | Kerfoot |
| 6,733,207 | B2 | 5/2004 | Liebert, Jr. et al. |
| 6,780,329 | B2 | 8/2004 | Kerfoot |
| 6,805,798 | B2 | 10/2004 | Kerfoot |
| 6,827,861 | B2 | 12/2004 | Kerfoot |
| 6,866,781 | B2 * | 3/2005 | Schindler .................... 210/620 |
| 6,872,318 | B2 | 3/2005 | Kerfoot |
| 6,913,251 | B2 | 7/2005 | Kerfoot |
| 6,984,329 | B2 | 1/2006 | Kerfoot |
| 7,022,241 | B2 | 4/2006 | Kerfoot |
| 7,033,492 | B2 | 4/2006 | Kerfoot |
| 7,131,638 | B2 | 11/2006 | Kerfoot |
| 7,156,984 | B2 | 1/2007 | Kerfoot |
| 7,264,747 | B2 | 9/2007 | Kerfoot |
| 7,300,039 | B2 | 11/2007 | Kerfoot |
| 2003/0029792 | A1 | 2/2003 | Kerfoot |
| 2004/0045911 | A1 | 3/2004 | Kerfoot |
| 2005/0067356 | A1* | 3/2005 | Bowman et al. ............. 210/747 |
| 2006/0243668 | A1* | 11/2006 | Miller et al. ................. 210/667 |

FOREIGN PATENT DOCUMENTS

| | | |
|---|---|---|
| JP | 6-023378 | 2/1994 |

OTHER PUBLICATIONS

"In-situ Air Sparging Without Inorganic Nutrient Amendment: An Effective Bioremediation Strategy for Treating Petroleum-Contaminated Groundwater Systems", R. Schaffner, Jr., et al., http://www.bioremediationgroup.org/BioReferences/Tier1Papers/insitu.htm, Jul. 30, 2003, pp. 1-14.

"Environmental Management", DON Environmental Restoration Plan for Fiscal Years 1997-2001, Sep. 30, 1996, pp. 4-1 to 4-8.

"How to Evaluate Alternative Cleanup Technologies for Underground Storage Tank Sites", *U.S. Environmental Protection Agency*, Oct. 1994.

"Yuma Pilot-Testing Ozone Sparging, Stripping", *Pasha Publications, Defense Cleanup*, Nov. 8, 1996, pp. 5-6.

"Chemical Degradation of Aldicarb in Water Using Ozone", F.J. Beltran et al., *Journal of Chemical Technology & Biotechnology*, 1995, pp. 272-278.

"Modelling Industrial Wastewater Ozonation in Bubble Contactors", *Ozone Science & Engineering*, vol. 17, 1995, pp. 379-398.

"Modelling Industrial Wastewater Ozonation in Bubble Contactors", *Ozone Science & Engineering*, vol. 17, 1995, pp. 355-378.

"Kinetics of the Bentazone Herbicide Ozonation", *Journal of Environmental Science and Health*, vol. A31, No. 3, 1996, pp. 519-537.

"Field Applications of In Situ Remediation Technologies: Chemical Oxidation", *U.S. Environmental Protection Agency*, Sep. 1998, pp. 1-31.

"Technology Status Review In Situ Oxidation", *Environmental Security Technology Certification Program*, Nov. 1999, pp. 1-42.

Design of a Packed Bed Ozonation Reactor for Removal of Contaminants from Water, Billing, *Dissertation Abstracts International*, vol. 57, No. 10, Apr. 1997, pp. 6398-B.

"Completed North American Innovative Remediation Technology Demonstration Projects", *U.S. Environmental Protection Agency, Office of Solid Waste and Emergency Response*, Aug. 12, 1996, pp. 1-35.

"Ground Water Issue", H.H. Russell et al., *U.S. Environmental Protection Agency*, Jan. 1992, pp. 1-10.

"In Situ Chemical Treatment", Y. Yin, Ph.D., *Technology Evaluation Report, GWRTAC*, Jul. 1999, pp. 1-74.

"Analysis of Selected Enhancements for Soil Vapor Extraction", U.S. Environmental Protection Agency, Sep. 1997, pp. 1-5 to 7-39.

"Single-phase Membrane Ozonation of Hazardous Organic Compounds in Aqueous Streams", P.V. Shanbhag et al., *Journal of Hazardous Materials* 41, 1995, pp. 95-104.

Gas Partitioning of Dissolved Volatile Organic Compounds in the Vadose Zone: Principles, Temperature Effects and Literature Review, J.W. Washington, Groundwater, vol. 34, No. 4, Jul.-Aug. 1996, pp. 709-718.

"Biologically Resistant Contaminants, Primary Treatment with Ozone", D.F. Echegaray et al., *Water Science and Technology, A Journal of the International Association on Water Quality*, vol. 29, No. 8, 1994, pp. 257-261.

"Toxins, toxins everywhere", K.K. Wiegner, *Forbes*, Jul. 22, 1991, pp. 298.

"In Situ Air Sparging System", *Tech Data Sheet, Naval Facilities Engineering Service Center*, Mar. 1997, pp. 1-4.

"Ground Water, Surface Water, and Leachate", http://www.frtr.gov/matrix2/section_4/4-30.html, Jul. 22, 2003, pp. 1-4.

"Alternate Technologies for Wastewater Treatment", J. Hauck et al., *Pollution Engineering*, May 1990, pp. 81-84.

"Cleaning up", *Forbes*, Jun. 1, 1987, pp. 52-53.

"In Situ Chemical Oxidation for Remediation of Contaminated Soil and Ground Water", *EPA*, Sep. 2000, Issue No. 37, pp. 1-6.

"Aquifer Remediation Wells", *EPA*, vol. 16, Sep. 1999, pp. 1-80.

"Effect of Organic Substances on Mass Transfer in Bubble Aeration", M. Gurol et al., *Journal WPCF*, vol. 57, No. 3, pp. 235-240.

"Clare Water Supply", *EPA*, http://www.epa.gov/region5/superfund/npl/michigan/MID980002273.htm, pp. 1-3.

"Who's Afraid of MTBE?", K.P. Wheeler et al., *Manko, Gold & Katcher*, http://www.rcc-net.com/Wheels.htm, Jul. 2000, pp. 1-5.

"RCC RemedOzone Mobile Remediation System", RCC.

"Santa Barbara I Manufactured Gas Plant Site", *California EPA*, Jan. 2002, pp. 1-6.

"Typical Applications of Ozone", ARCE Systems, Inc., http://www.arcesystems.com/products/ozone/applications.htm, Feb. 2000, pp. 1-2.

"Strategies to Protect Your Water Supply from MTBE", Komex Industries, http://www.komex.com/industries/remediation.stm, 2002, pp. 1-8.

"In Situ Remediation with Chemical Oxidizers: Ozone, Peroxide and Permanganate", Environmental Bio-systems, Inc., pp. 1-5.

"Newark Brownfield Site to Increase Student Housing", Environmental Alliance Monitor, http://www.envalliance.com/monitor&pubs/1998fall.htm, 1998, pp. 1-8.

"In Situ Ozonation to Remediate Recalcitrant Organic Contamination", J. Dablow et al., IT Corporation, pp. 1-2.

"Reaction of Ozone with Ethene and Its Methyl- and Chlorine-Substituted Derivatives in Aqueous Solution," P. Dowideit et al., Environmentals Science & Technology, vol. 32, No. 8, pp. 1112-1999, (1998).

"The Ultrox System: USEPA Ultrox International Ultraviolet Radiation/Oxidation Technology", Applications Analysis Report, EPA/540/A5-89/012, Sep. 1990.

"Advanced Oxidation Processes for Treating Groundwater Contaminated with TCE and PCE", Aieta et al., 1988, Pilot-Scale Evaluations., Journal of American Water Works Association, JAWWAS, vol. 80, No. 5, pp. 64-72.

"Treatment of VOC-Contaminated Groundwater by Hydrogen Peroxide and Ozone Oxidation", Bellamy, W.D., G.T. Hickman, P.A. Mueller, and N. Ziemba, Res. J. Water Pollution Control Fed. 63, 120., 1991.

U.S. Appl. No. 11/145,871, selected pages from Image File Wrapper, Jun. 12, 2007 through Jun. 27, 2008, 82 pages.

PCT/US05/25478, International Search Report & Written Opinion, mailed Feb. 15, 2006, 4 pages.

PCT/US05/25478, International Prelliminary Report on Patentability, Jan. 23, 2007, 4 pages.

* cited by examiner

SUPEROXIDANT POISER FOR GROUNDWATER AND SOIL TREATMENT WITH IN-SITU OXIDATION-REDUCTION AND ACIDITY-BASICITY ADJUSTMENT

BACKGROUND

This invention relates generally to water remediation systems and techniques.

There is a well-recognized need for removal of subsurface contaminants that exist in aquifers and surrounding soils. Such contaminants can include various man-made volatile hydrocarbons including chlorinated hydrocarbons, e.g., volatile organic compounds such as chlorinated olefins including trichloroethene (TCE), tetrachloroethene (PCE), cis 1,2-dichloroethene and vinyl chloride. Other compounds include aromatic or polyaromatic ring compounds such as benzene, toluene, methylbenzene, xylenes, naphthalene, and propellants or explosives such as nitroanilines, trinitrotoluene, and so forth. The groups of compounds are characterized by aromatic ring structures also include alkyl substituted aromatic hydrocarbons.

SUMMARY

Effective treatment may involve not only oxidation but also adjustment of Eh and pH back to original aquifer conditions.

With current practices of in-situ oxidation, an aqueous chemical mixture with a known oxidation potential, such as hydrogen peroxide, hydrogen peroxide plus ferrous iron (a Fenton's Reagent), permanganate and so forth is injected into unsaturated or groundwater saturated soil to induce a fixed chemical oxidation reaction. If the oxidant is supplied in sufficient excess quantity to react with the target organic substrate, the reaction ensues and yields a set of expected products, primarily carbon dioxide ($CO_2$), water, and oxygen ($O_2$). However, with some contaminants undesirable byproducts can be formed. In that instance, the applier generally reformulates a new mixture or procedure to provide reactions having more desirable end products. Therefore, multiple injections of different mixtures may result in much higher costs of treatment than were initially anticipated by the applier.

Reactions such as oxidation or reduction focused on aqueous or adsorbed organic compounds also produce side reactions with the soil or bedrock matrix. Metallic or nonmetallic cations such as iron ($Fe^{+2}$ or $Fe^{+3}$), manganese ($Mn^{+2}$ or $Mn^{+4}$), calcium ($Ca^{+2}$), copper ($Cu^{+2}$ and $Cu^{+1}$), chromium ($Cr^{+3}$ and $Cr^{+6}$), and so forth, under oxidation or reduction can become involved in secondary reactions. The control of undesirable competing oxidation/reduction (redox) reactions can be accomplished by limiting the mass or strength of oxidation or by actively reversing the redox condition by programmed combinations of gases and/or liquids.

According to an aspect of the present invention, a method includes receiving a signal from a sensor and determining an oxidation potential of a soil/water formation based on the signal from the sensor. The method also includes selecting an oxidant based on the determined oxidation potential to introduce the oxidant into the soil/water formation under conditions to allow for adjustment of the determined oxidation potential of the soil/water formation.

According to an additional aspect of the invention, an apparatus includes a mechanism to deliver oxidant and fluid to a microporous diffuser and a diffuser that allows delivery of the oxidant and the fluid to a soil formation. The diffuser and mechanism are arranged such that one of the oxidant and fluid forms a coating over the other of the oxidant and fluid. The apparatus also includes a controller responsive to a signal that corresponds to a determined oxidation potential of the soil formation. The controller produces a signal that causes the apparatus to couple to the diffuser a source of oxidant selected from a plurality of sources of oxidant of differing oxidant potential, to adjust and maintain a selected molar ratio of oxidant to contaminant present in the soil formation.

According to an additional aspect of the invention, an apparatus includes a microporous diffuser and a mechanism to deliver an oxidant or a reductant to the microporous diffuser. The apparatus also includes a controller that is responsive to a signal that corresponds to a determined oxidation-reduction potential of the soil formation to select oxidant or reductant to deliver to the microporous diffuser to adjust a molar ratio of the oxidant or reductant to contaminant present in the soil formation.

According to an additional aspect of the invention, an apparatus includes a first mechanism to deliver oxidant to a first microporous diffuser and a second mechanism to deliver a liquid to a second microporous diffuser. The apparatus also includes a first microporous diffuser that allows delivery of the oxidant and liquid to a soil formation. From the first microporous diffuser the liquid forms a coating over the oxidant. The apparatus includes a second microporous diffuser that allows delivery of the oxidant to the soil formation. In the formation, the second microporous diffuser is arranged relative to the first microporous diffuser, to allow the second microporous diffuser to release oxidant under the liquid coated oxidant. The apparatus also includes a controller responsive to a signal that corresponds to a determined oxidation potential of the soil formation to adjust and maintain a selected molar ratio of oxidant to contaminant present in the soil formation.

According to an additional aspect of the invention, an apparatus includes a first mechanism to deliver a reductant to a first microporous diffuser and a second mechanism to deliver a liquid to a second microporous diffuser. The apparatus includes a first microporous diffuser that allows delivery of the reductant and liquid to a soil formation with the liquid forming a coating over the reductant. The apparatus also includes a second microporous diffuser that allows delivery of the reductant to the soil formation with the second microporous diffuser to release reductant under the liquid-coated reductant. The apparatus includes a controller responsive to a signal that corresponds to a determined oxidation potential of the soil formation to adjust and maintain a selected molar ratio of reductant to contaminant present in the soil formation.

One or more of the following advantages may be provided by one or more aspects of the invention.

With the apparatus and process the operator can control the rates of oxidation and subsequent reduction in the aquifer and as well as the matrix chemistry of the aquifer, despite changes in horizontal velocity, background mineral deposit variation, and residual inorganic byproduct formation. The coordinate matrix chemistry of the aquifer, particularly the surface matrix anion/cation surface participates in aqueous redox reactions, despite having its own buffering capacity from stored amounts of iron, silicates, carbonates or sulfates, and can be adjusted during or following redox reactions. This allows the use of very strong oxidants or, conversely, very strong reductant gases, such as nitrogen or helium diluted hydrogen (to avoid explosive conditions) or hydrogen sulfide for short periods of time followed by redox adjustment back, close to preexisting conditions.

The programmable logic controller (PLC) is supplied with the total mass of oxidant required to oxidize the contaminants of concern and soil oxidative demand (SOD) and an appropriate ratio of gas to liquid. The unit programs the time sequence of additions of mass. Feedback into the PLC from the pH, ORP probe in the aquifer is used to modify the rate of additions or schedule additions of reductive treatment following the oxidative mass completion to bring the aquifer back into balance (poising) at a prescribed oxidation/reduction potential (ORP).

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
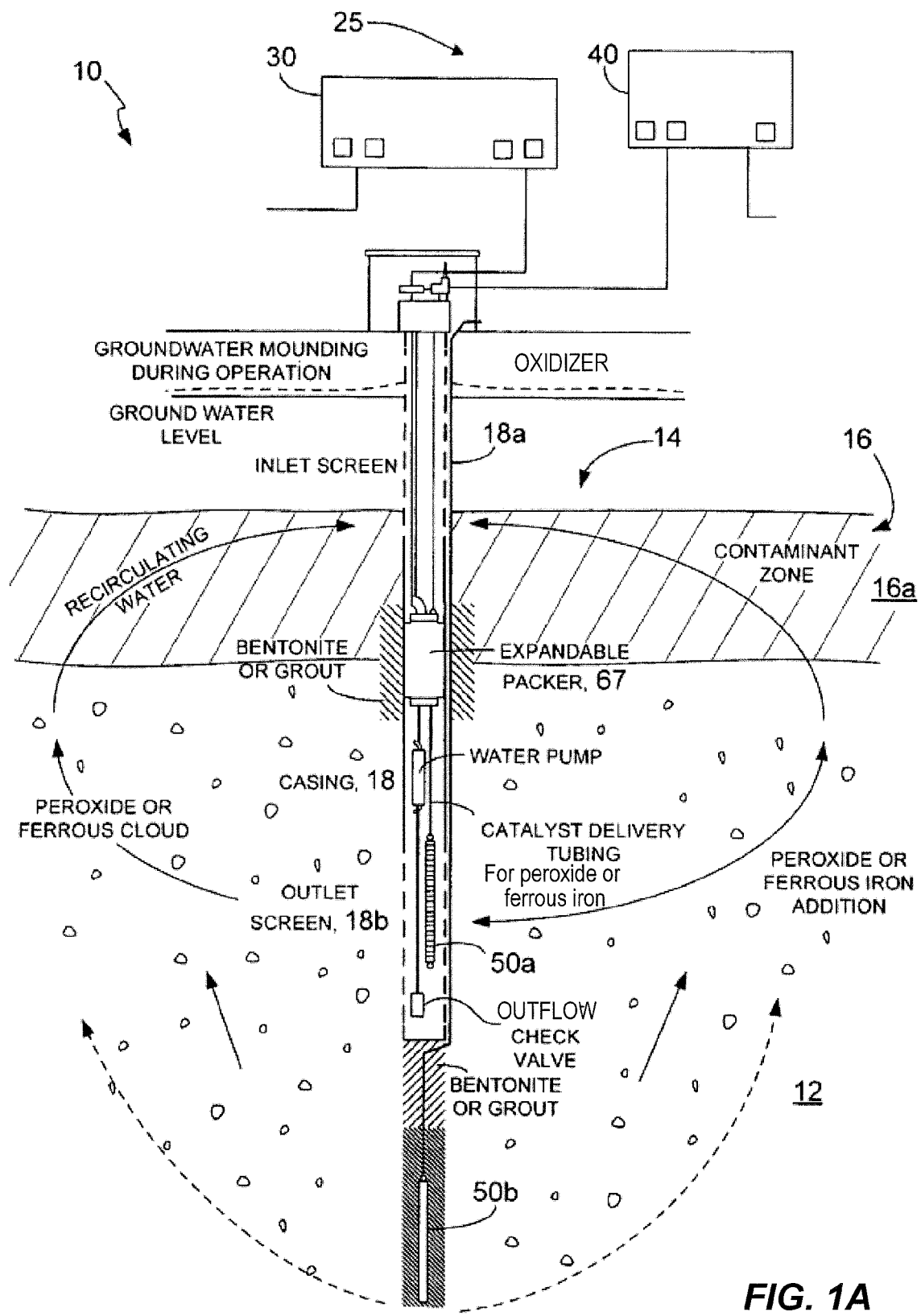
FIG. 1A is a diagram depicting an apparatus for recirculation well system.

Referring to FIG. 1A, an example for a treatment system 10 to treat contaminants in a subsurface aquifer 12 includes an sparging apparatus 14 that is disposed through a soil formation 16. In this arrangement, the sparging apparatus 14 is disposed through a soil formation 16 e.g., a vadose zone 16a and an underlying aquifer 12. The sparging apparatus 14 includes a casing 18 that is positioned through a borehole disposed through the soil formation 16. The casing 18 has an inlet screen 18a disposed on an upper portion thereof and an outlet screen 18b disposed on a bottom portion thereof. Disposed through the casing 18 is a first microporous diffuser 50a. Alternatively, a slotted well-screen could be used. In some embodiments, the microporous diffuser 50a is a laminate microporous diffuser. A second microporous diffuser 50b is disposed in a borehole that is below the borehole containing the casing 18, and is surrounded by a sand pack and isolated by Bentonite or a grout layer from the borehole that has the first microporous diffuser 50a. Also disposed in the casing is a packer 17 that isolates the upper screen 18a from the lower screen 18b and appropriate piping to connect sources of decontamination agents to the microporous diffusers 50a, 50b. When fluid is injected through the microporous diffusers 50a, 50b the packer 17, screens 18a, 18b and a water pump 19 enable a re-circulation water pattern 13 to be produced in the soil formation.

Figure 1B:
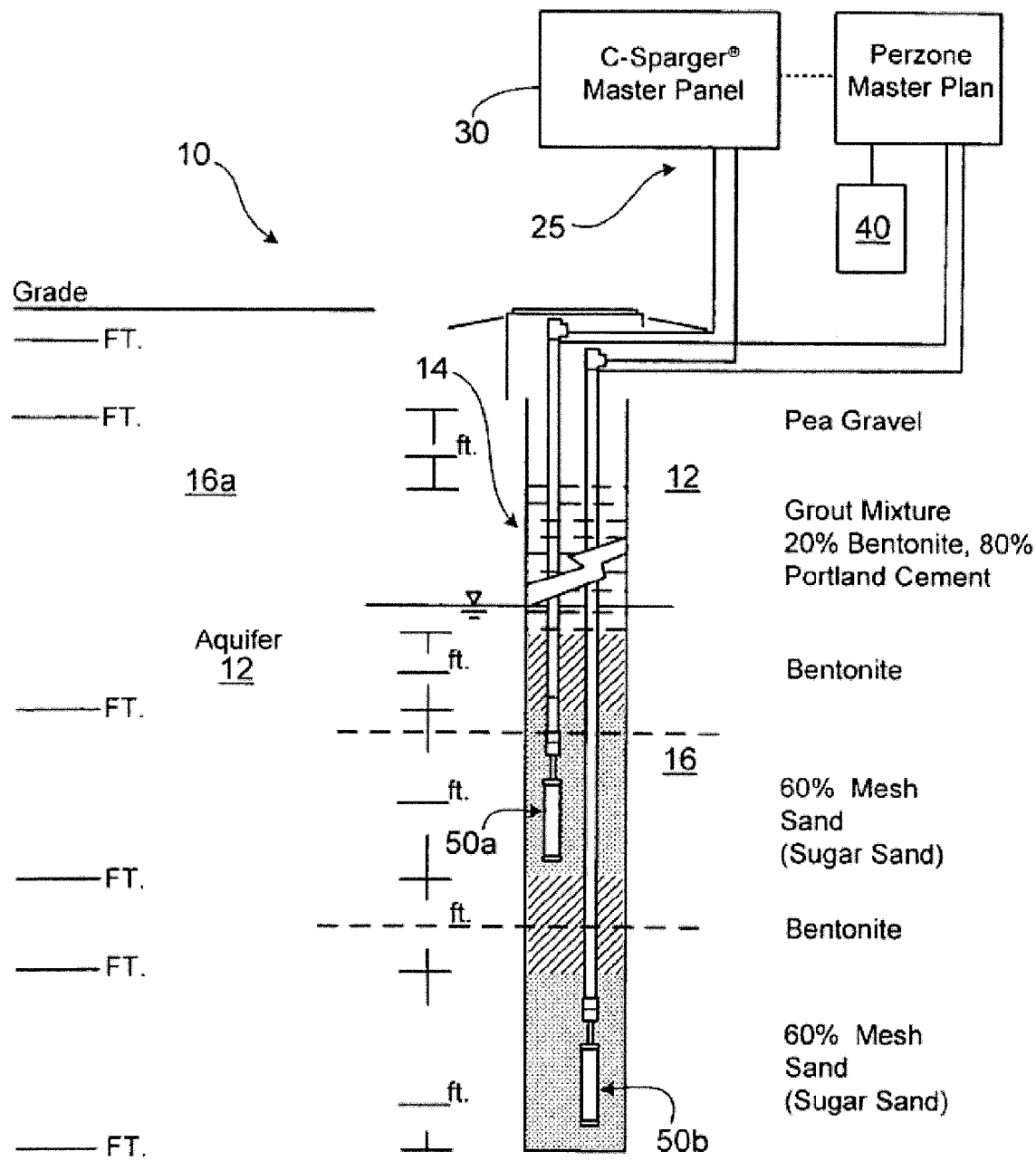
FIG. 1B is a diagram depicting an apparatus for a dual point well system.

As shown in FIG. 1B, other arrangements are possible. For instance, the arrangement could use two microporous diffusers packed in a sand pack, e.g., a 60 mesh sand pack and which are separated by a Bentonite layer. This arrangement is an example of a non-recirculation arrangement thus, obviating the need for the packer for instance. Still other arrangements are possible.

The arrangement 10 (or 10') also includes apparatus 25 including a gaseous decontaminate apparatus 30, which in some embodiments is an oxidizer apparatus and in others is a reducing apparatus and a liquid supply apparatus 40, which in some embodiments is an oxidizer apparatus and in others is a reducing apparatus. The gaseous decontaminate apparatus 30 and liquid supply apparatus 40 include a control system as will be discussed below.

Figure 2:
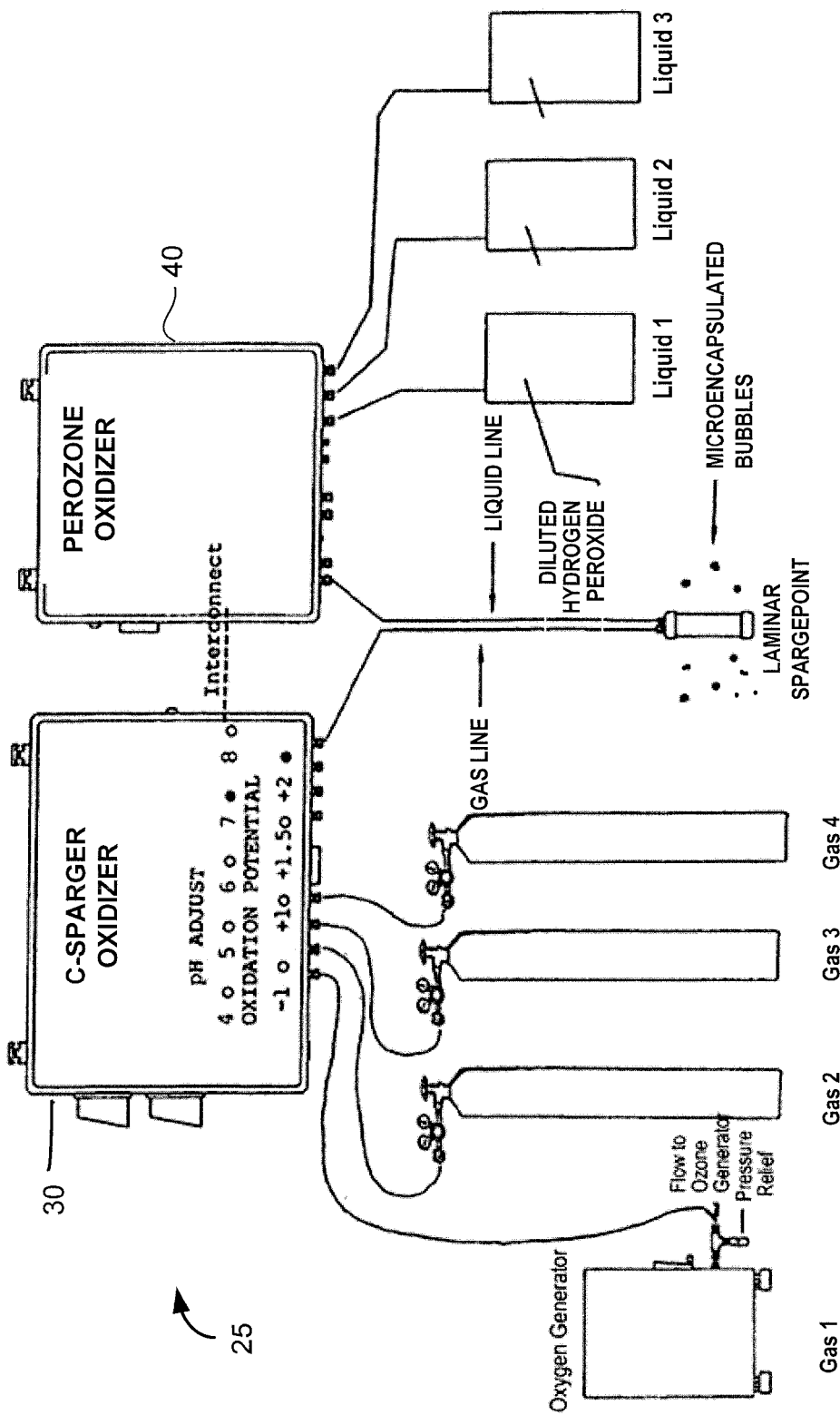
FIG. 2 is a schematic diagram of gas and liquid delivery and control system.

Referring to FIG. 2, a simplified view of either arrangement of FIG. 1A or 1B or other arrangements is shown with apparatus 25 including the gaseous decontaminate apparatus 30 and liquid supply apparatus 40 coupled to one of the microporous diffusers, e.g., 50a and 50b. The gaseous decontaminate apparatus 30 is shown as an oxidizing apparatus 30 having several inlets that are supplied via different gas sources Gas 1-Gas 4 and several outlets that provide different outputs from the gas sources Gas 1-Gas 4. In addition, the liquid supply apparatus 40 is shown as an oxidizing apparatus having several inlets that are supplied via different liquid sources Liquid 1-Liquid 3 and several outlets that provide different outputs from the liquid sources Liquid 1-Liquid 3. If used in the arrangement of FIG. 1A or 1B, the outputs of the oxidizer apparatus 30 and the liquid supply apparatus 40 would be coupled to both of the microporous diffusers 50a, 50b, however for simplicity only one of the diffusers is shown. Alternatively, only one or more than two the microporous diffusers could be used in a common well arrangement.

Figure 3:
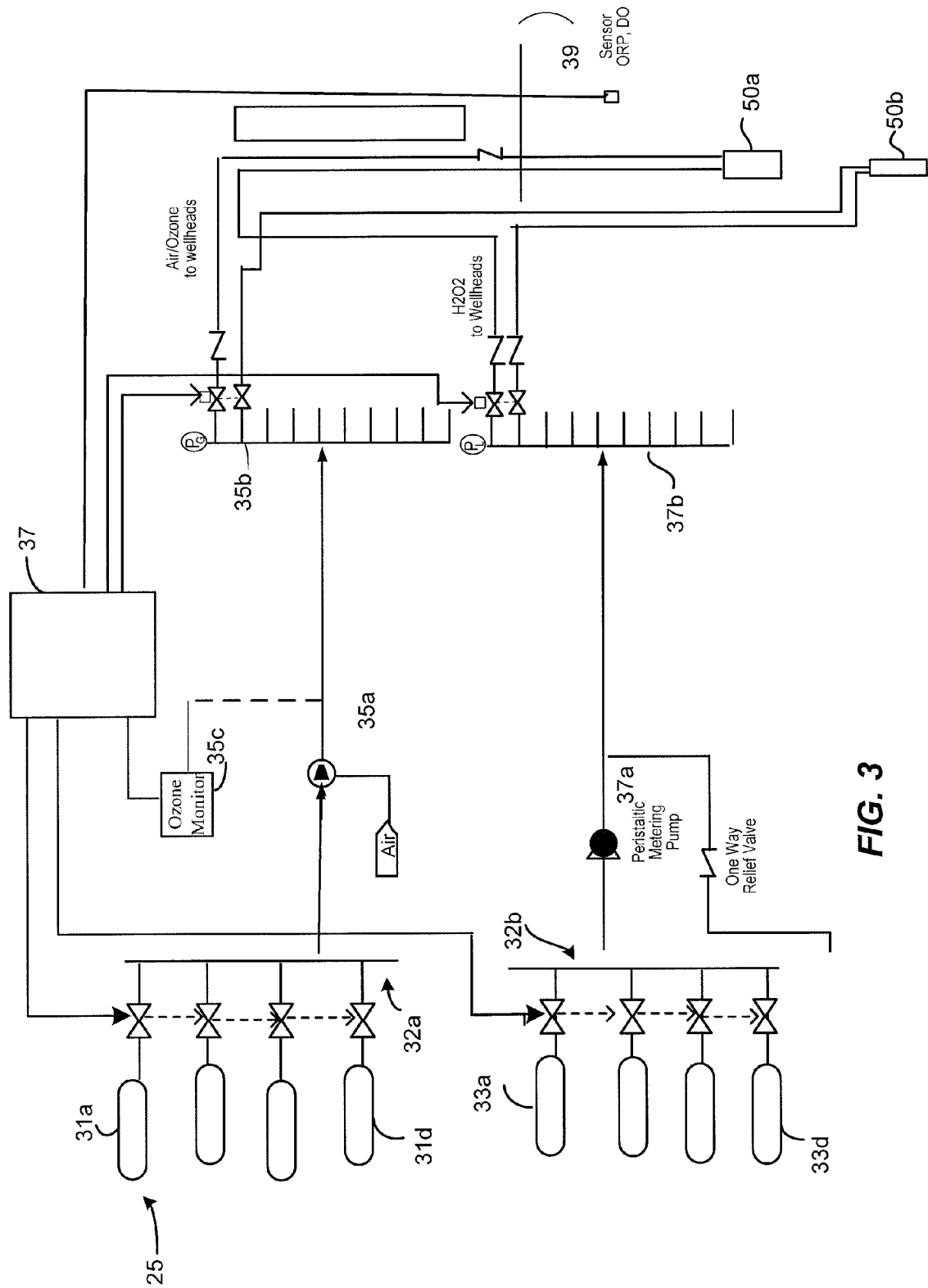
FIG. 3 is a schematic diagram of gas and liquid delivery and control system.

Referring to FIG. 3, the apparatus 25 including the gaseous decontaminate apparatus 30 and liquid supply apparatus 40 are shown. The gaseous decontaminate apparatus 30 is shown as an oxidizer apparatus and includes oxidizing sources (four being shown) 31a-31d, a manifold 32a and an air compressor 35a, e.g., pump that feeds a gas mixture to a manifold 35b that distributes the mixture to the microporous diffusers 50a, 50b, as well as other microporous diffusers in different wells (not shown). Generally, the gas sources on the oxidative side can be air, oxygen, ozone, and nitrogen oxide, or nitrogen dioxide. Some of the sources can be supplied via the ambient air, e.g., an oxygen generator and an ozone generator can be used to supply oxygen and ozone from air, a nitrogen filter can be used to supply nitrogen, whereas others can be supplied from bottled sources, e.g., nitrogen oxide. The sources are connected to the manifold 32a via solenoid-controlled valves that are controlled via a controller 37.

Alternatively, in some applications the sources can be reducing materials. As reducing materials, gases can be hydrogen sulfide ($H_2S$), hydrogen (diluted with nitrogen or helium), or sulfur dioxide ($SO_2$) and would be substituted for the sources 31a-31d. Some of the sources can be supplied via the ambient air, e.g., a nitrogen filter can be used to supply nitrogen, whereas others can be supplied from bottled sources, e.g., hydrogen gas, helium-hydrogen or nitrogen-hydrogen gas mixture.

A similar arrangement is provided for the liquid supply apparatus 40. The liquid supply apparatus 40 includes liquid sources (four being shown) 33a-33d, a manifold 32b and pump 37a that feeds a liquid mixture to a manifold 37b that distributes the liquid mixture to the microporous diffusers 50a, 50b, as well as other microporous diffusers in different wells (not shown). Generally, the liquid sources on the oxidative side can be hydrogen peroxide, a hydro-peroxide that is a substantial by-product of reaction of a target contaminant with the gas, e.g., ozone and water, superoxides, ozonides, or a permanganate (potassium or sodium) solution. The sources are connected to the manifold 32b via solenoid-controlled valves that are controlled via the controller 37.

Alternatively, in some applications the sources can be reducing materials. As reducing materials, the liquids can be sodium dithionate, sodium thiosulfate ferrous sulfate, or ferrous sulfite and would be substituted for the sources 33a-33c.

In some embodiments, the gaseous decontaminate apparatus 30 includes a remote process monitor (not shown) that communicates with the controller 37. A pH oxidation reduction potential (ORP) or DO sensor 39 is typically disposed in a monitoring well within the zone of influence of the sparging well, e.g., about half of the radius of the zone of influence. The sensor 39 senses the oxidation potential and pH of the surrounding soil formation during operation of the equipment and sends data back to the controller to adjust and maintain material flow to provide a concomitant adjustment in the oxidation potential and pH of the formation.

An ozone monitor 35c is disposed in the oxidizer apparatus 30 to monitor for adverse ozone conditions in the equipment.

The liquid supply apparatus 40 also includes a liquid level sensor, (not shown) to monitor liquid level in the sources. The water, hydrogen peroxide or other hydroperoxides are provided via sources. Alternatively, hydrogen peroxide or ozone can be generated from water in a container by applying electricity to electrodes in the container, instead of using a prepared solution.

One approach would be to start the system with peroxide-coated bubbles, which can readily degrade PAHs and switched to sodium permanganate as organics show reduction to one-third original concentrations. This approach could substantially reduce the SOD (soil oxidant demand) requirement of the permanganate system while providing long-term residual oxidation of chloroethenes for instance. Because permanganate is transported with microbubbles, as discussed below it is actively dispersed rather than relying on density alone to distribute the permanganate.

Also supplied to the microporous diffusers are promoters or nutrients, as well as catalyst agents 42 including iron containing compounds such as iron silicates, ferrous iron, acetic acid, or palladium containing compounds such as palladized carbon or other transition metals in acid solution. In addition, other materials such as platinum may alternatively be used. The promoters or nutrients are introduced with the hydroperoxides. The hydroperoxides are also produced by reactions that decompose the contaminants. In the presence of the hydroperoxides, the promoters or nutrients can combine with the hydroperoxides to promote and accelerate the decomposition reactions.

The mixture of air/ozone affects substantial removal of contaminants such as various man-made volatile hydrocarbons including chlorinated hydrocarbons, chlorinated olefins such as tetrachloroethylene, trichloroethylene, cis 1,2-dichloroethene and vinyl chloride and other compounds e.g., aromatic ring compounds, propellants, explosives, and so forth that are found as contaminants.

The electronic and mechanical system to control the sparging apparatus 10 or 10' includes a gas pump and a liquid pump that are controlled via a mechanical time sequencer, or computer based controller, as discussed below, either of which is programmed to deliver a selected mass of each material per unit time producing a mixture of predetermined oxidation potential. The oxidation potential, the mass/time, pressure, and time sequence are set electronically. An oxygen generator feeds an ozone generator, allowing the ratio of ozone to oxygen to be set. The liquid delivered is water and hydroperoxide.

Referring now to FIGS., 4A and 4B the control process allows an operator to set or program a time sequence for varying degree of oxidation potential of the mixture for the in-situ treatment. Various approaches can be used to provide the controller for the system.

Figure 4A:
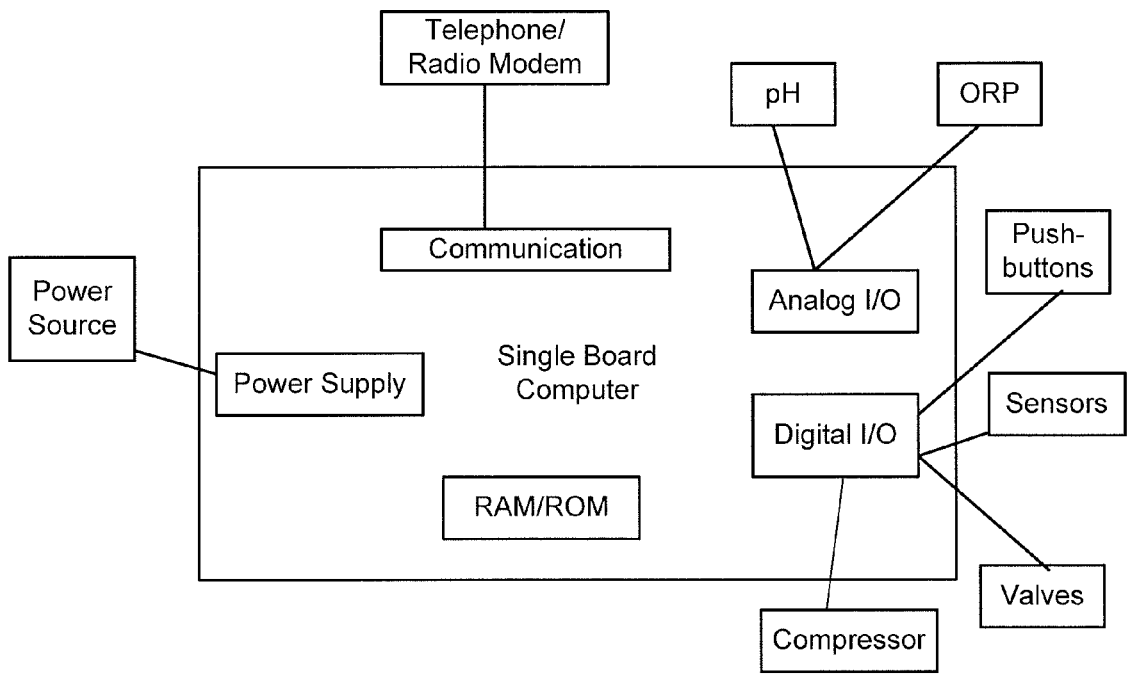
FIGS. 4A and 4B are block diagrams depicting exemplary computer-based controllers.

In one example, a dedicated single board computer could be used (FIG. 4A). The controller would receive signals from the operator and sensors and produce outputs that would be used to control peripheral relays to activate the valves and the compressor.

Figure 4B:
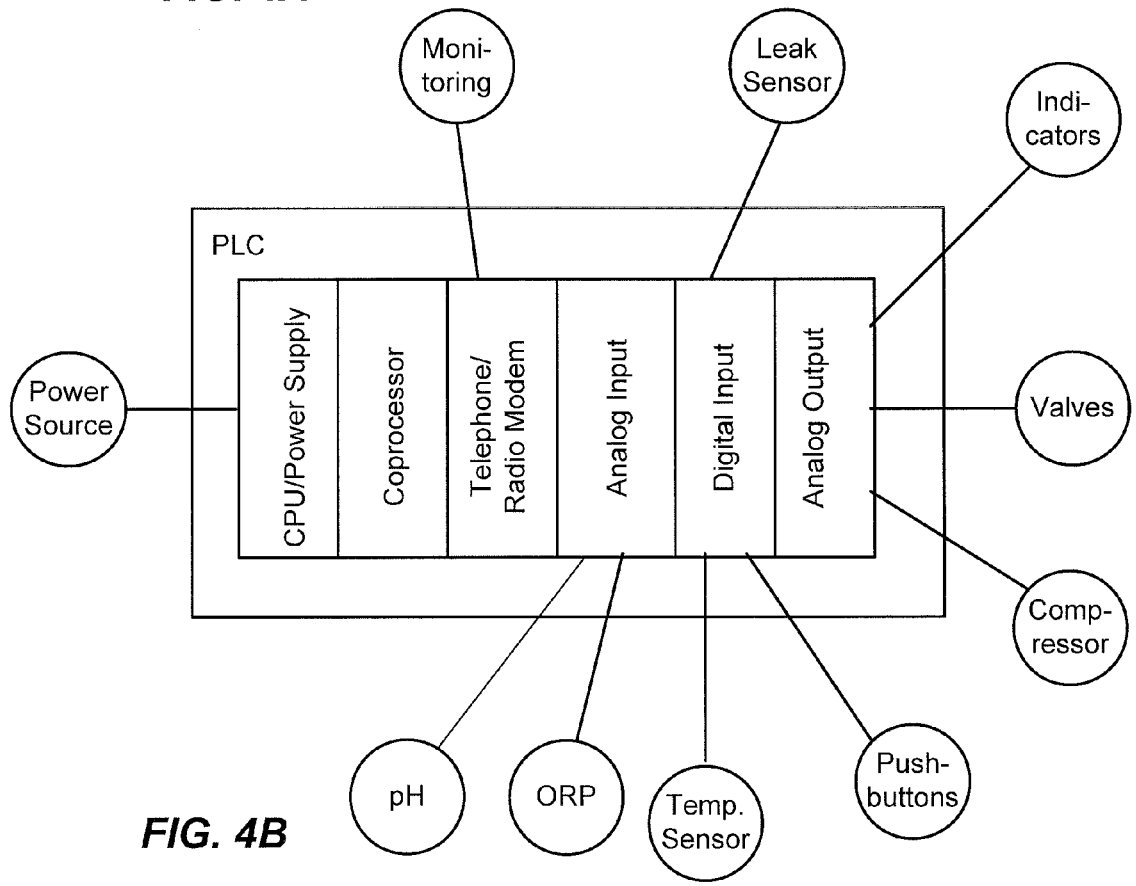

Another implementation of the control function would be to use a modular programmable logic controller (PLC) (FIG. 4B). One advantage would be the ability to easily size the control function to match the scale of an installation. If more wells were desired, additional modules could be added.

In a PLC based implementation, an A/D converter could be connected to analog sensors to receive the signals from the sensors. The A/D converter could send the signals to inputs of a digital I/O interface module. The I/O module would be used to send signals to control the valves and compressor. A coprocessor module would add computational power to the control arrangement but may not be required in all systems. If telephone or wireless control or monitoring is required, a communications module and associated peripheral may be added as desired. Other arrangements are possible. For instance, a personal computer (PC) could be used.

Figure 4C:
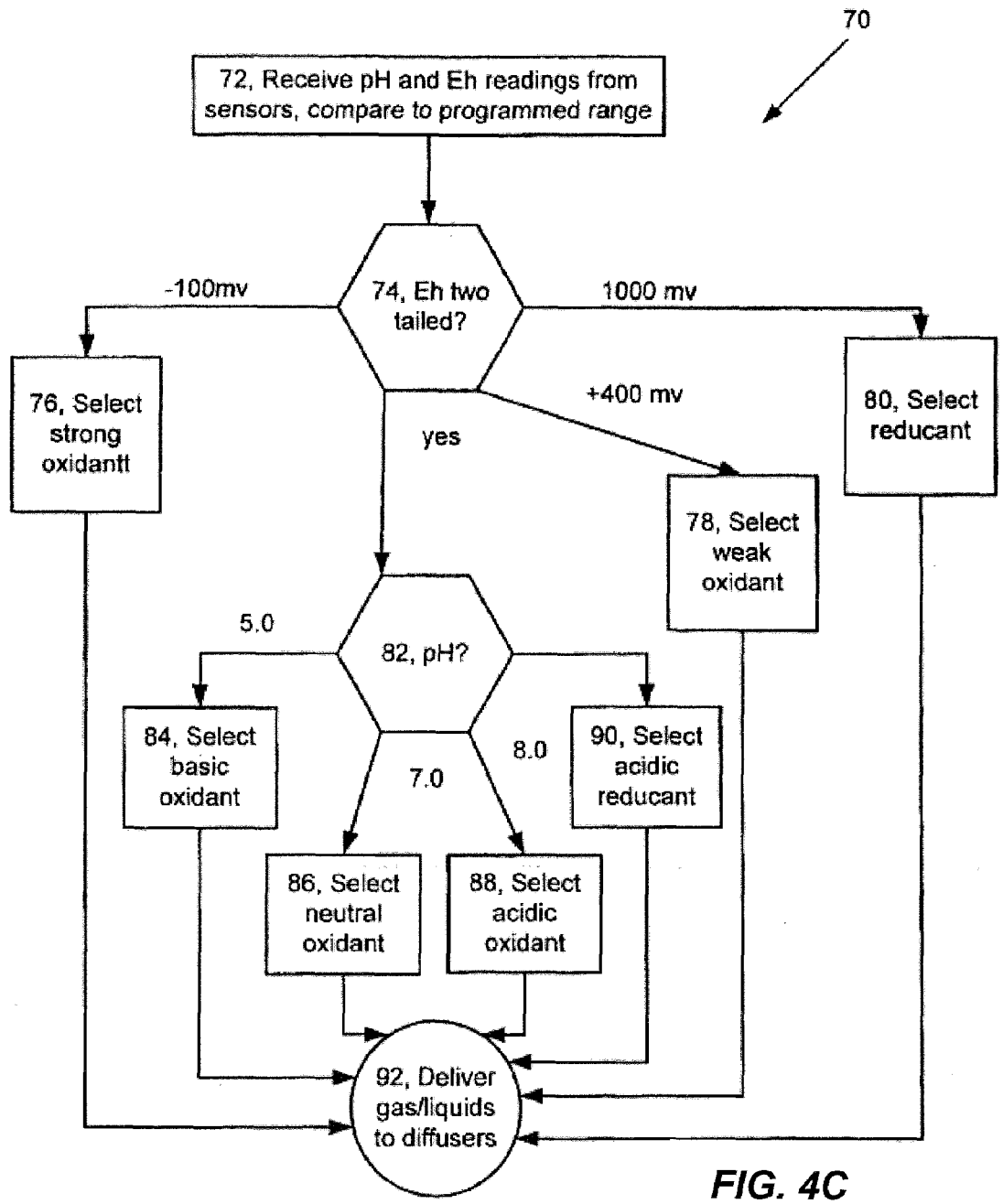
FIG. 4C is a flow chart depicting a typical process flow.

Referring to FIG. 4C, a typical process flow control 70 is shown. The controller would be programmed to allow the apparatus to select different sources of oxidant or oxidant potentials according to readings from sensor(s) disposed in a zone of influence of the apparatus. The controller receives 72 a reading from the sensors and determines the Eh (oxidation-reduction) potential 74 of the formation. Initial the soil/groundwater matrix may be at reducing conditions (−100 mv), which can occur in initial phases of treatment in the presence of bacterial degradation of the spilled organics that have depleted the original dissolved oxygen. If the soil is at a reducing condition, the process flow 70 sends a signal to the apparatus to select 76 a strong oxidant, e.g., ozone and hydrogen peroxide, ozone, or dissolve ozone or hydrogen peroxide, to feed into the microporous diffusers. Similarly if the Eh of the formation is above about +400 mv indicating an excessive oxidant condition, the controller signals the apparatus to select 78 a weak oxidant potential material, such as oxygen or if the Eh is above, 1000 mv e.g., the controller signals the apparatus to select 80 a reducing agent, e.g., hydrogen gas or hydrogen sulfide gas, as appropriate. If the process 70 determines that, the potential is two-tailed, e.g., lying within a range of greater than about −100 mv and less than about +400 mv the process checks the pH.

The process 70 determines 82 the pH (acid-base) of the formation. If the formation has a pH of about 5.0 or less, i.e., it is too acidic, the process 70 signals the apparatus to select 84 a basic type oxidant, which can be any of the oxidants mentioned and which is supplied with a material to raise the pH of the soil formation, such as carbon dioxide. If the formation has a pH of about 7.0, i.e., it is neutral, the process 70 signals the apparatus to select 86 a neutral type oxidant, e.g., the oxidant material. If the formation has a pH of about 8.0 or less, i.e., it is slightly basic, the process 70 signals the apparatus to select 88 an acidic oxidant. If the formation is has a pH of about 8.0 or more, i.e., it is too basic, the process 70 signals the apparatus to select 90 an acidic type reductant. After selecting the appropriate oxidant/reducant material, the gas/liquids are delivered 92 to the diffusion apparatus, e.g., microporous diffusers.

Advantages of the apparatus 10 include the ability to adjust the chemical oxidation capacity of the treatment material to the organic contaminant mixture present in the soil being treated. The apparatus 10 also provides the ability to adjust the concentration (mass delivery) of the treatment material to match the mass of contaminant. The apparatus 10 adjusts the thickness of bubble to change density of nano/microbubble (buoyancy) and reactive surface film. In addition, the apparatus 10 can adjust pressure of pulsing (e.g., amplitude/pressure wave) to drive micro/nanobubbles through the formation.

Other features include the ability to adjust duration of pulse (wave length) to improve dispersion and bubble mixture, and to adjust time sequence or alternate oxidation state or species involved (PLC or simple sequencer control). The apparatus 10 delivers different compositions of treatment material on a fixed or selective schedule (e.g., via a programmable sensor feedback mechanism) by Eh/ORP (oxidation-reduction) and/or pH (acid-base) monitors disposed in the treatment site, e.g., aquifer, soil formation and so forth. Eh is the electromotive force, (e-potential) when measured on a Calumel electrode, whereas ORP (oxidation reduction potential) is more of a chemist's discussion of stability of reaction kinetics. Essentially these two quantities, Eh and ORP are measuring the same characteristics.

Additionally, the apparatus 10 adjusts the Eh (oxidation-reduction) and/or pH (acid-base) of a formation for control of soil matrix anions and cations. With segregation of location of injection, reactants can come together by injection of microbubbles below the coating material, using buoyancy to displace the bubbles through the coating material.

The apparatus 10 allows oxygen in various combinations of gaseous and liquid forms to produce microbubbles of different composition of oxygen forms including hydroxides, superoxides, and hydroperoxides having increasing oxidative potential. The oxidative potential of the reactive mixture is set to more cost-effectively degrade the byproducts of the decomposition of the contaminants without reformulation and re-injection. The degree of oxidative potential that is needed is determined based on various techniques such as laboratory bench-scale pressure-slurry tests and review of ORP limits based on Eh/pH diagrams (Pourbaix) of undesirable byproducts.

The adjustment of oxidation potential (i.e., reducing capacity) provides the ability to adjust the coordinate chemistry of the soil/water matrix to the correct reduction/oxidation (redox) condition and pH and target compounds to be decomposed without producing side effects of unwanted byproducts, such as transferring trivalent chromium to hexavalent chromium while decomposing polyaromatic hydrocarbons.

Initially, the soil/groundwater matrix is often at reducing conditions (−100 mv) in the presence of bacterial degradation of the spilled organics that have depleted the original dissolved oxygen. The capacity to decompose the poly aromatic hydrocarbons (PAH), e.g., 3 or more aromatic rings, requires reaching an oxidation potential sufficiently high to break the bond structure, but low enough to prevent undesirable side reactions with the mineral matrix.

The capability of adjustment of oxidation potential can be used to treat soils having polyaromatic hydrocarbons, where the parent compound is poorly soluble in water, but fragments with simpler benzene rings (e.g., BTEX, phenols, aromatic carboxylic acids, and so forth) may be VOCs with significantly higher solubility.

A less efficient technique to introduce liquid would include separating gas introduction and liquid introduction in the substrate by using sand-packing around a central gas introduction tube or by sequentially flooding the region with liquid, like peroxide, above or around a single point and sending a fine bubble stream through a fine diffuser through the mixture. A secondary siphon-effect could be developed but the uniformity of coating would not be as controlled.

Formation of a superoxidant occurs with several approaches programmed to deliver to a formation. These approaches include the following:

1. Ozone and peroxide
2. Ozone and ferrous iron
3. Ozone/peroxide and ferrous iron, which can occur by leaching from a microporous diffuser, e.g., a Spargepoint® (from Kerfoot Technologies, Inc.) that has ferrous iron introduced in its hydrophilic packing; added to the ozone and peroxide as a liquid amendment; added from natural occurrence of ferrous iron in a reduced aquifer.

In the above cases, the byproducts of reaction end as innocuous natural products typically $O_2$, $H_2O$, or $Fe^{3+}$.

Clean oxidation reactions are important in environmental chemistry. A large number of compounds can be oxidized by contacting them with forms of oxygen in the liquid and adsorbed phase at moderate temperatures. This type of reaction, liquid-phase, free-radical oxidation, or auto-oxidation, is an important process in the chemical industry or as a cause of deterioration of many materials exposed to air, ozone, or sunlight-produced free radicals such as the hydroperoxides.

The capacity of a form of oxygen to initiate an oxidation reaction is often referred to as its oxidation potential, presented in an electrochemical table form with its half reaction. The more complex an organic molecule is, the higher the oxidation potential that is required to allow a reaction involving the molecule to proceed. For disassociation of any molecule requires a cleavage of a hydrogen-carbon bond (relatively easy) or a carbon-carbon bond (relatively difficult, especially with increasing stability of double bonds in aromatic compounds). The ease with which the reaction begins depends upon the strength of the bond and the oxidative potential of the oxygen molecule. The objective in most reactions is to break down the substrate compound into simpler carbon fragments (like alcohols or carboxylic acids) that can be readily mineralized (directly transform to $CO_2$ and $H_2O$) or be metabolized by bacteria or the end product like $CO_2$.

FIGS. 5-9 show that the apparatus 10 can be configured in various ways to provide different configurations of delivery of treatment material.

Figure 5:
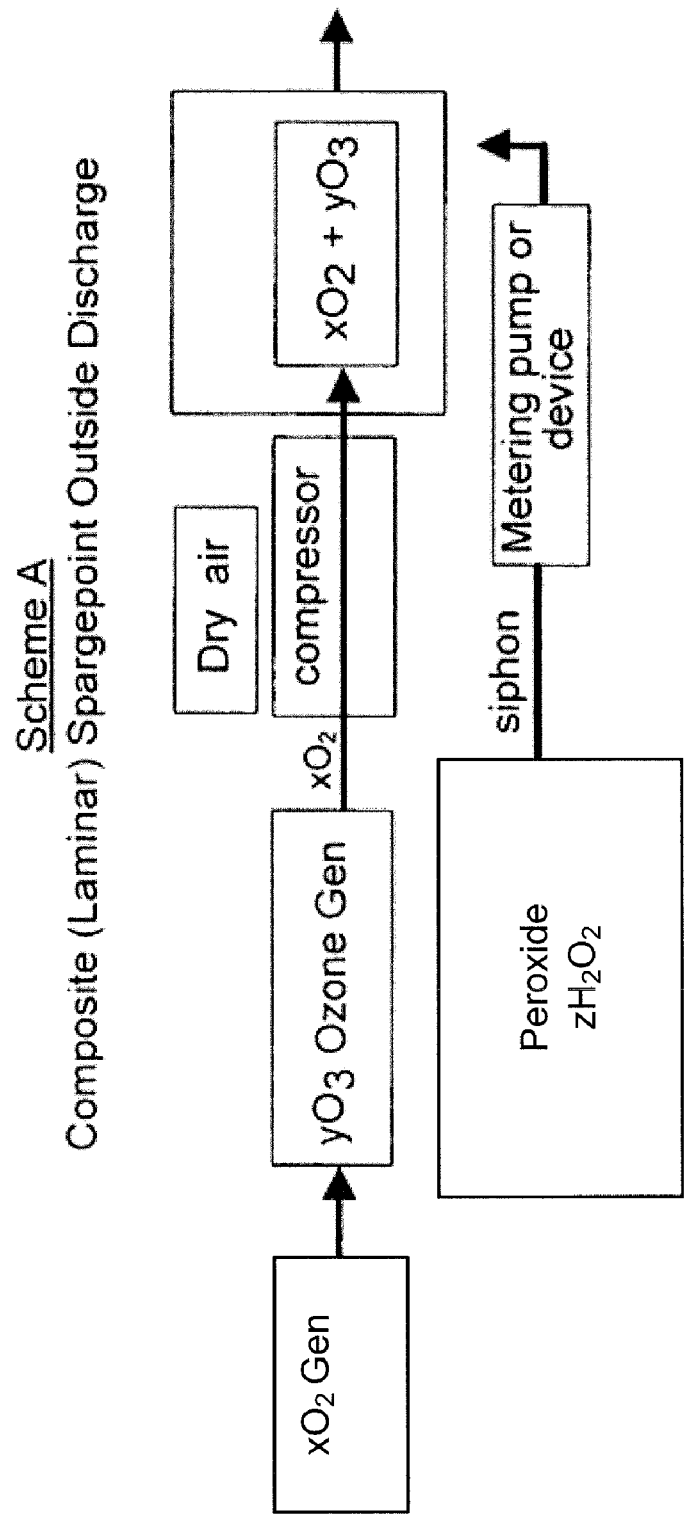
FIGS. 5-9 are diagrams depicting various treatment configurations.

FIG. 5 shows a composite Laminar microporous diffuser arrangement (e.g., a Laminar Spargepoint described in U.S. Pat. Nos. 6,436,285 and 6,582,611 or obtainable from Kerfoot Technologies, Inc.) that produces an outside discharge of air/ozone bubbles having a coating of hydrogen peroxide or a hydroperoxide.

Figure 6:
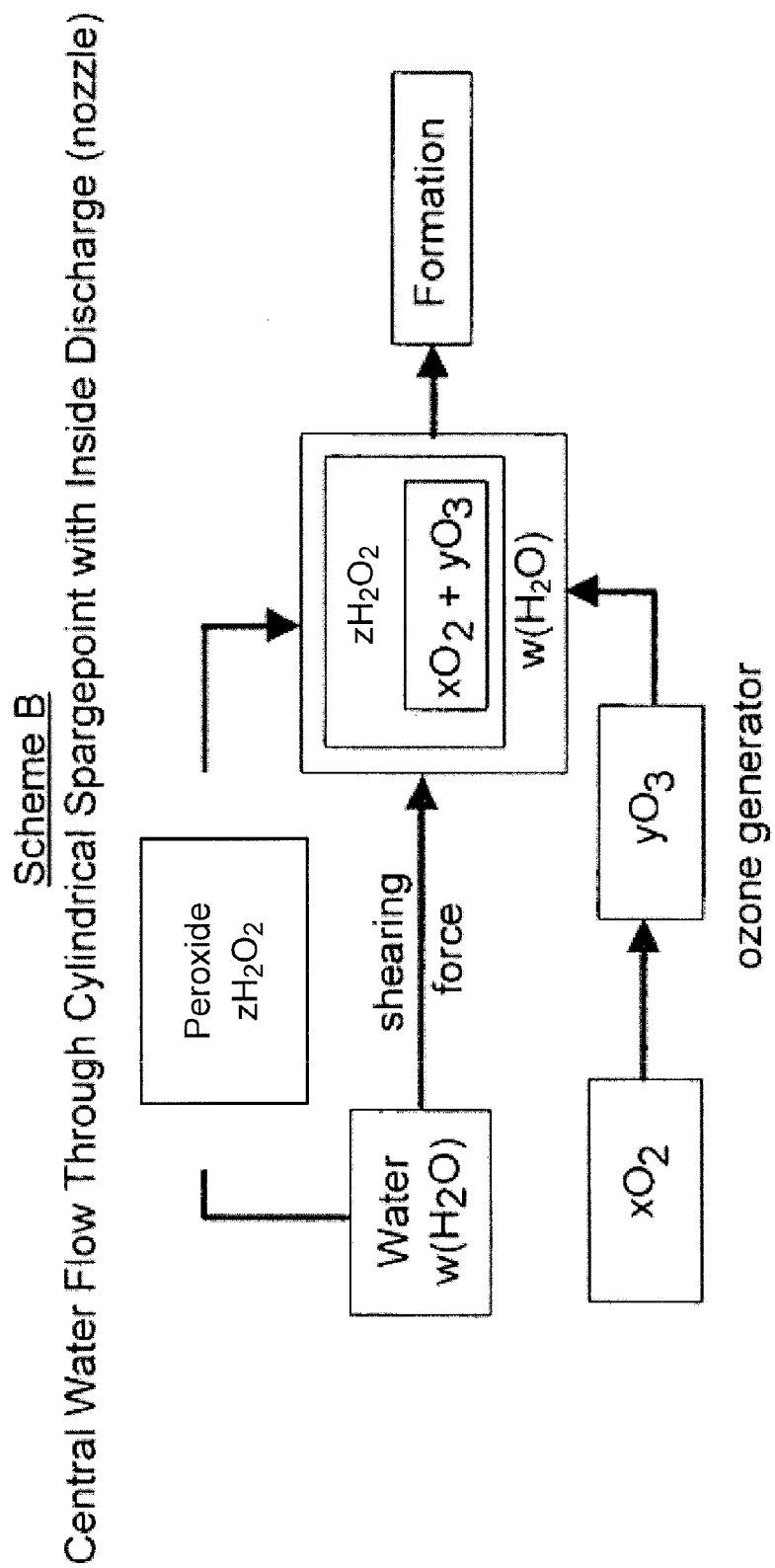

FIG. 6 shows a central water flow through an inverted cylindrical microporous diffuser, e.g., a Spargepoint with an interior discharge (nozzle). The arrangement involves the discharge of water through the center of a microporous double cylinder with a non-permeable sheath. The gas enters an outer zone between an outermost plastic or stainless steel barrier and an inner microporous (0.5 to 200 micron) cylinder including support material (rings or mesh) and flows towards the center. Liquid is drawn into a microporous hydrophilic layer and coats a gas stream passing there through. The liquid and gas flows may be subject to pulsing (±5 psi) of their flows at frequent intervals (e.g., 0.5 to 10 times/sec) to provide an internal shear as the bubbles exit against the shearing force from the water or liquid velocity. With this arrangement nano to micro-size bubbles can be produced to flow in a water stream out from a well screen (either recirculated vertically or provided from surface tank, flowing outwards or towards a laterally-located withdrawal well).

Figure 7:
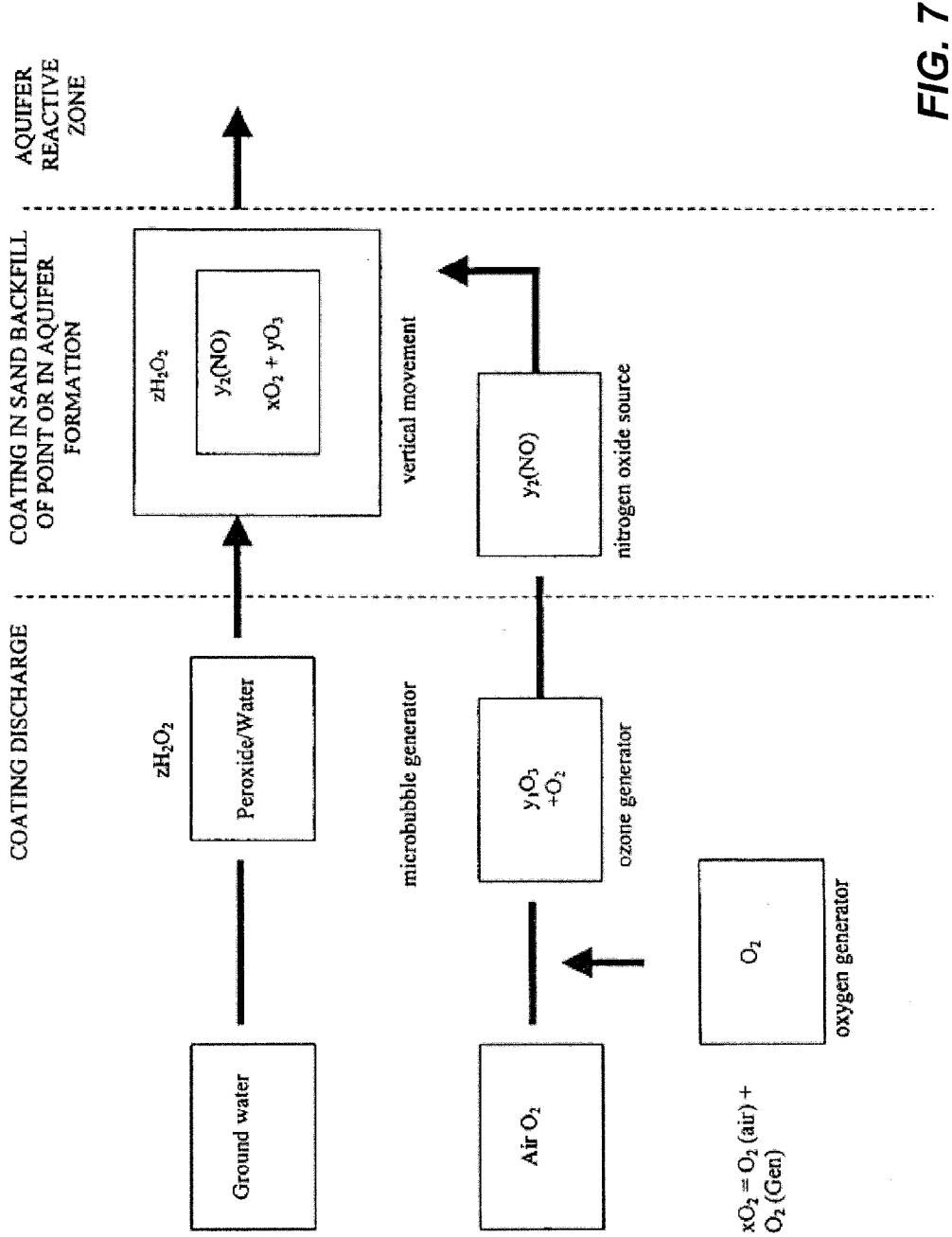

FIG. 7 shows a vertical separation of a hydroperoxide layer with lower oxygen release. In the arrangement of FIG. 7, vertical separation occurs between the cylinders of liquid introduction and gas introduction. The microporous gas generator is placed below the liquid generator so that the rising microbubbles pass through the liquid addition. The introduction cylinders can be segregated or supplied by a line passing through the center of the other. In either case, the bubbles rise while the denser upper liquid falls. A feed tubing arrangement can be configured with a line inside a line or by parallel tubes with an external sheath that is either wrapped or molded about the tubes.

This arrangement can be used with ozone/hydroperoxide or ozone/ferrous iron since both liquids are denser than water and will drift downwards as the bubbles rise. Nitrous oxide could also be added to the ozone gas stream to accelerate certain organic oxidations.

Figure 8:
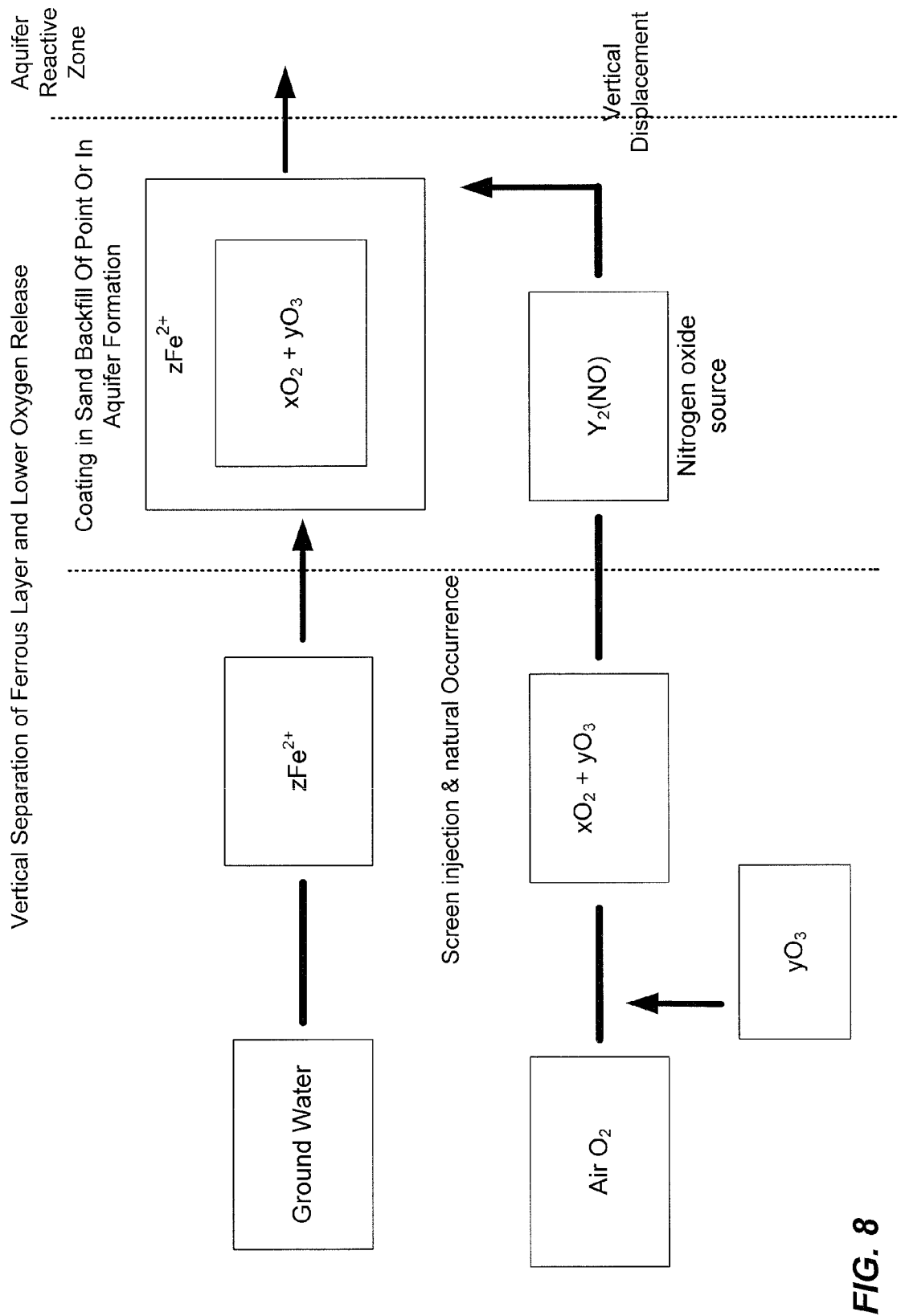

FIG. 8 shows another vertical separation scheme, this one involving a ferrous layer and lower oxygen release. This arrangement can be used for the injection of oxygen and ozone into naturally occurring ferrous iron solutions in ground water. These commonly occur when bacterial anaerobic decomposition prevails, and the matrix Eh drops below, e.g., −50 mv. Ozone injected into ground water under these conditions will react to release the hydroxyl radical, catalyzing a more rapid decomposition of alkanes (TOH) in residual fuel spills (e.g., gasoline, diesel, or #2 fuel oil). The injection of ferrous iron through well screens (0.010 slot) can provide a continuous supply to react with the ozone microbubbles (as in FIG. 7). Ferrous iron cannot be added through a double microporous point as in A or B because of $Fe^{+3}$ clogging, unless nitrogen gas substitutes for oxygen and carbon dioxide in normal air.

Figure 9:
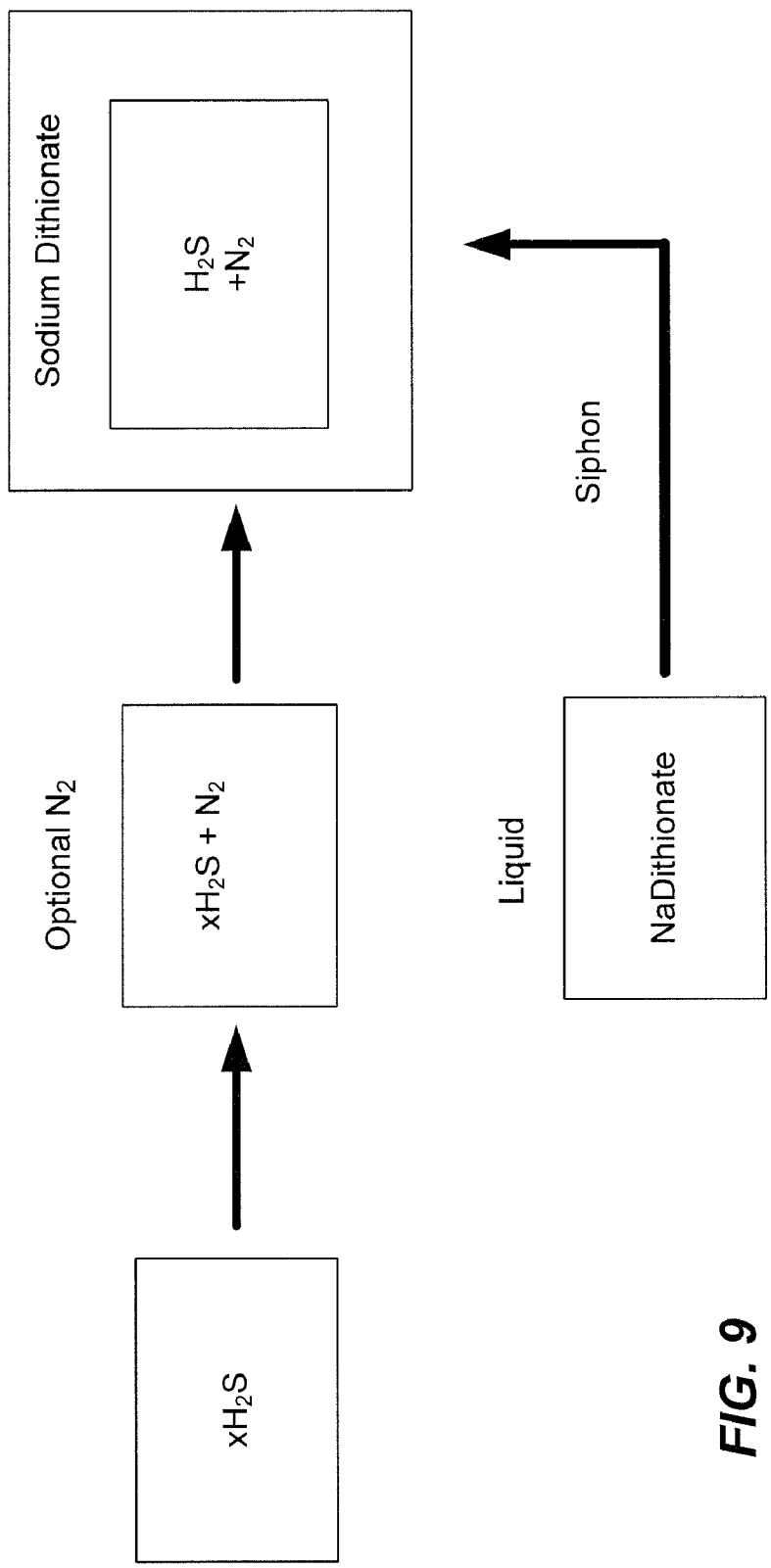

FIG. 9 depicts a composite (Laminar) Spargepoint with outside discharge for use in a reduction treatment condition. In this configuration, reducing gas ($H_2S$) and/or reducing liquid (sodium dithionate) are added to reduce the Eh of the aquifer and to precipitate solubilized (mobilized) metal species (hexavalent chromate, copper, zinc, arsenic). Nitrogen from air is supplied as a carrier gas by a nitrogen generator (molecular sieve separator) or by a tank. Microporous diffusers e.g., as in scheme A or B can be used with this system.

The schemes can be used in combination. For example, the Scheme of FIG. 5 can be used to remove MTBE/BTEX and TPH from gasoline fuel spills. However, if oxidant is added too rapidly producing dissolved hexavalent chromium, the unit can turn on the scheme in FIG. 9 to reduce the Eh below, e.g., 400 mv, to remove the hexavalent chromium by reversing the equilibrium of trivalent to hexavalent (see Pourbaix diagram, FIG. 13).

If a plume of complex substrate material is approaching a treatment containment line with expected different arrival times, the unit could be set to deliver the necessary oxidation potential and mass which would be needed for each fraction as it arrives.

The use of liquid and gas mixtures allows injection where a pulsed pressure is applied to the microporous diffuser, producing a negative pressure, which siphons in liquid to contact the gas surface of resulting microbubbles. The microbubbles are ejected into groundwater within soils or surface waters with sediments to contact the organic contaminants. The pulse pressure is set to fall within 1 to 40 psi above ambient pressure at the location of injection. The duration ranges can be for instance from a few minutes e.g., 5 or so to 100 minutes or more.

In FIG. 6, oxygen from a molecular sieve separator (generator) is sent through an ozone generator (Corona tube) and diluted with air before entering the central chamber of the microporous diffuser. Peroxide liquid is pulled into the surrounding hydrophilic microporous material by suction, often passing through a metering pump to deliver the correct mass to the strength of the gases. The gases are normally pulsed on and off at suitable pressures (e.g., 15 minutes, 10 psi) to promote dispersion through the saturated or unsaturated soils.

An electronic sequencer of the gas system has solenoid controlled valves of the controller connected with liquid-carrying solenoid controlled valves of the liquid metering pump. The ratio of air from the compressor to gas type ($O_2$ or $O_3$) is programmed to provide a mass of gas, which when combined with the liquid type, yields a mass in grams/hr (e.g., 10 gms/hr) at a certain oxidative potential (e.g., 2.8 volts). Following initial injection of a peroxide-coated ozone mixture with uncoated ozone may more effectively remove the dissolved fraction, since the injection of high oxidative potential oxygen, e.g., superoxides, O., may break aromatic rings but produce a large mass of soluble aromatic fractions in groundwater. Using the programmable controller to cycle between the two may be desirable. An exemplary cycle can be one day, 2.8 volts and two days, 2.07 volts, with the cycle repeated until a sufficient quantity of the adsorbed PAH mass is removed.

The laminar microporous diffusers, U.S. Pat. Nos. 6,436, 285 and 6,582,611 or obtainable from Kerfoot Technologies, Inc. (gas/liquid Spargepoints®) or equivalents, deliver gas and liquid to porous zones (vadose or saturated). The microporous diffuser produces microbubbles that siphon a liquid coating, as bubbles pulsed through capillary pores, yielding a water/coating liquid/gas/coating liquid/water peristaltic transport through microscopic capillary pores of the soil. The greater the hydrostatic pressure existing on the microporous diffuser, the higher the siphoning pressure produced. This indicates that with Boyle's Law of Increased Pressure, the smaller the internal volume of the bubble causes a concomitant enlargement of the microbubble due to capillary (meniscus) pressure to accommodate a higher surface area of the microbubble (or microcylinder) in the capillaries.

The cylindrical microporous diffuser, in which the gas is sent through the center of the microporous diffuser and through micropores across a sandwiched hydrophobic microporous layer connected to the liquid supply, is the most efficient approach to produce the flow. The intense negative pressure developed during operation occurs without any pump power provided. A metering mechanism is desirable to maintain a constant flow of liquid, but if sufficient volume is not supplied, the liquid can be subjected to sufficient vacuum pressure to produce boiling (degassing) of the liquid. A vacuum relief check valve for each liquid source can be used to increase flow during these conditions.

Areas of soils containing petroleum products or spilled solvents can be treated to an extraordinary degree of efficiency, with removal efficiencies approaching stoichiometric ratios. The gases, particularly ozone, are efficiently dispersed throughout the treatment area. Half-life of ozone ranges from 10 to 30 hours following injection is commonly expected, which is 10 to 30 times' previously expected half-life ranges.

Figure 10:
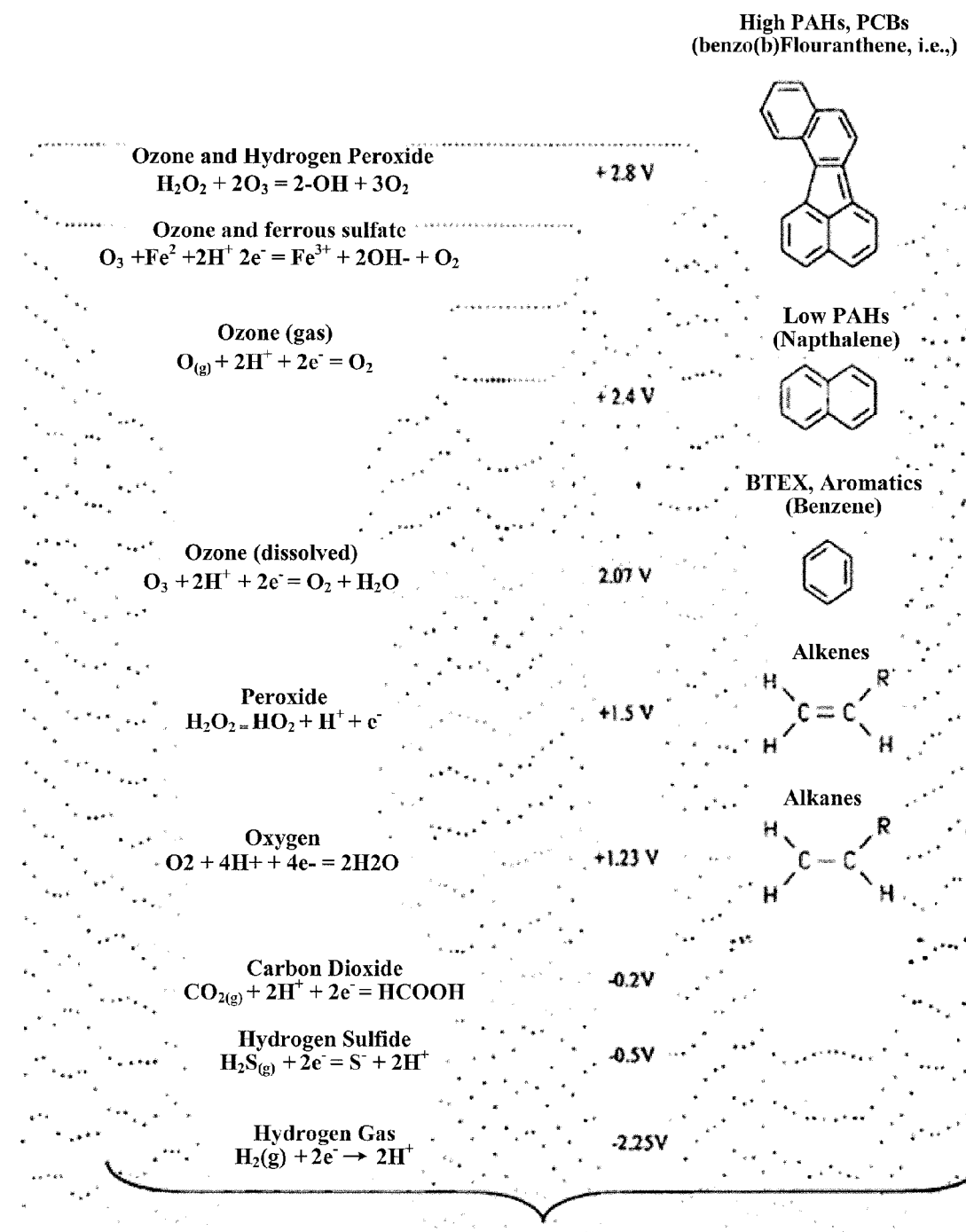
FIG. 10 is a diagram of oxidation-reduction potentials of compounds and exemplary target compounds.

Referring to FIG. 10, the oxidative capacity of the system can be adjusted to deliver a maximum mixture approaching or slightly exceeding 2.8 volts, capable of breaking down polycyclic aromatic compounds, like naphthalenes, anthracenes, phenanthrenes, and chrysene relatively easily. As these compounds are broken down, the oxidative capacity of the apparatus is programmed so as not to exceed 400 mv ORP in the saturated soil to avoid producing hexavalent chromium from trivalent chromium present as mineral surface coatings on the soil matrix, particularly with weathered bedrock. After sufficient oxidation, the region is purged with $H_2S$ gas to bring the aquifer back to its original ORP/pH. If neutralization is necessary because of chlorinated solvent decomposition (to HCl, dilute hydrochloric acid), carbon dioxide can be added from the air or a cylinder to produce bicarbonates and carbonates to raise the pH to the original condition. In some instances purging the region with nitrogen gas (to remove excess $CO_2$ or $O_2$) will allow the soil matrix to revert to its original condition.

The system uses air-ozone sparging where bubbles of air-ozone are injected into treatment areas. When air is bubbled through ground water in soil pores, dissolved VOCs transfer from the liquid to gas phase in accordance with Henry's Law.

The microporous diffusers, e.g., a C-Sparger® microporous diffuser, produce extremely small "microbubbles" (0.3 to 200 micron) with a very high surface area-to-volume ratio. This high surface area-to-volume ratio maximizes VOC transfer from the liquid phase to the gas phase. If the air bubbles contain sufficient ozone for decomposition, the VOCs react with the ozone and are destroyed while still in the water column.

With MTBE decomposition, hydrogen peroxide is released, producing an OH. radical coating that also speeds reaction. This in situ combined VOC recovery and destruction not only obviates the need for an additional process step, but also enhances the physical and chemical kinetics of the process.

For field applications, the process engineer defines the oxidant requirement for the site based on factors such as the stoichiometric oxidation requirements for the chemicals of concern, the soil oxidant demand (SOD), the aqueous oxidant needs for metals carbonates, and sulfides, and the in situ decomposition rate of the ozone.

While not being bound by theory, the theory section below provides a practical technique to determine stoichiometric oxidant demand. This oxidant demand computation procedure is contrasted with the time to completion of treatment at a spill site.

Theory

When ozone is bubbled into an aqueous solution containing dissolved VOCs, ozonation may occur in either the aqueous phase or the gas phase. Whether the VOC transfers into the ozone-containing bubble and is destroyed in the gas phase, or the ozone dissolves in the water around the skim surface of the bubble and destroys the VOC in the aqueous phase is primarily dependent upon the rate of reaction of each VOC with ozone. Table 1A shows the oxidation capacity of different ozone states compared with those of other common oxidants. Table 1B shows the reduction potential of common reduction agents.

TABLE 1A

| Oxidation Potential | |
| --- | --- |
| Catalyzed Ozone (OH.) | 2.80 V |
| Fenton's Reagent | 2.76 V |
| Ozone (Gas) | 2.42 V |
| Ozone (Molecular) | 2.07 V |
| Permanganate | 1.67 V |
| Nitrous Oxide | 1.59 V |
| Hydrogen Peroxide | 1.50 V |

TABLE 1B

| Reduction Potential | |
| --- | --- |
| Hydrogen (gas) | −2.23 |
| Sulfite ($SO_3^{2-}$) | −1.12 |
| Ferrous ($Fe^{2+}$) | −.41 |

Figure 11:
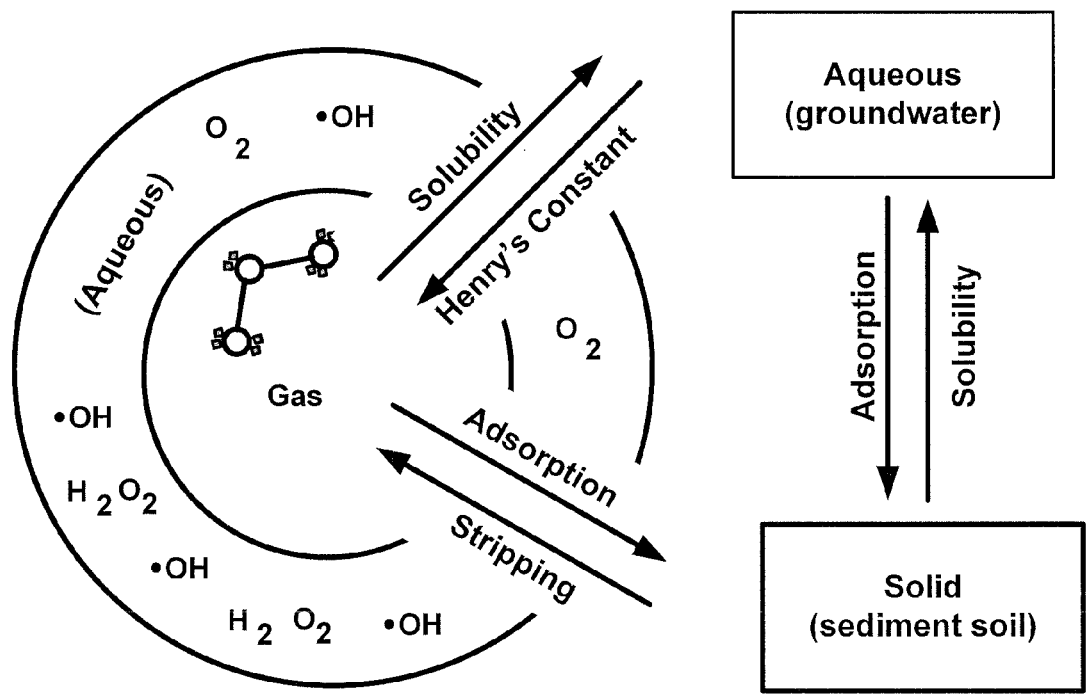
FIG. 11 is a schematic of a microbubble showing gas/aqueous/solid triangle partitioning coefficients.

Referring to FIG. 11, a view of organic oxidation reactions and partitioning environment in a microbubble for ozone-initiated reactions is shown. In accordance with Henry's Law, dissolved VOCs are driven into a gas phase and the gaseous ozone is driven into an aqueous phase. This will result in various reactions occurring at the bubble-liquid interface, whether in the gas-film or liquid-film of the bubble. Whether the primary decomposition reaction is occurring in the gaseous or liquid phase, oxygenates are driven by partitioning into the bubble environment. The smaller the bubble, the greater the surface-to-volume ratio and ability to "strip" volatile organics (Kerfoot, et al., Tenth Annual Outdoor Actions Conference National Groundwater Association Columbus Ohio pp 77-97 (1996).

The thin film theory of Henley and Seader (1981) Equilibrium State Separation Operations in Chemical Engineering Chapter 16, John White and Sons, New York, N.Y., as summarized in Kerfoot (2002) Kerfoot, W. B. "Microbubble Ozone Sparging for Chlorinated Ethene Spill Remediation." In: Innovative Strategies for the Remediation of Chlorinated Solvents and DNAPLS in the Subsurface American Chemical Society, Division of Environmental Chemistry, Washington, D.C. describes the mass transfer of a reactant across a liquid and a gas film before it contacts the other reactant.

MTBE has a Henry's Constant of 6.9E-04 atm $m^3$/mol, about ⅛ that of BTEX compounds. However, the high surface to volume ratio of micron-sized bubbles enhances the in situ stripping capacity (partitioning from aqueous to gaseous phase) to allow effective extraction.

Oxidation Chemical Mechanisms

Figure 12:
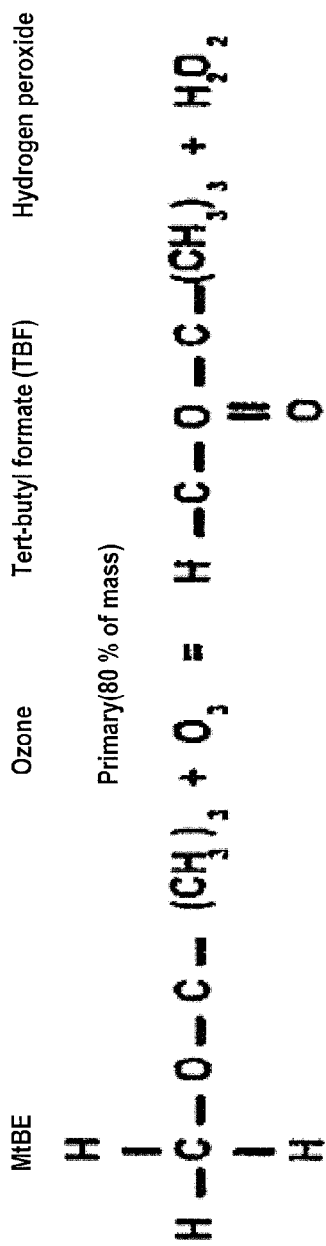
FIG. 12 is a diagram depicting primary and secondary reactions of ozone with MTBE.
Figure 12:
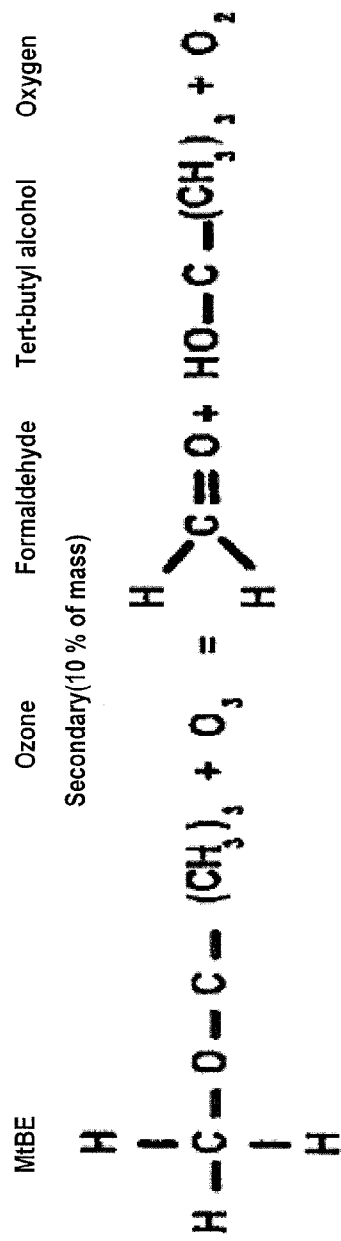

Referring to FIG. 12, primary and secondary reactions of MTBE with Ozone are shown. Karpel vel Leitner, R. N., A. L Papailhous, J. P. Crove, J. Payrot, and M. Dore (1994) "Oxidation of Methyl tert-Butyl Ether (MTBE) and Ethyl tert-Butyl Ether (ETBE) by Ozone and Combined Ozone/Hydrogen Peroxide" Ozone Science and Engineering 16, 41-54, described reaction pathways of ozone and MTBE in dilute aqueous solution using controlled experimental conditions. The primary reaction (90% of the consumed mass of MTBE) results in the formation of tert-butyl formate and hydrogen peroxide. A second parallel reaction (less than 10% of the consumed mass of MTBE) generates formaldehyde, TBA, and oxygen.

Initially, in the system 10 the peroxide is concentrated around the shell of the microbubbles. Since the peroxide will later decompose to oxygen and water, the surrounding groundwater will become highly oxygenated. Oxygen contents in excess of 10 mg/L are common.

Oxidant Application and Spread

Clayton, W. S. 1998 "Ozone and Contaminant Transport During In-Situ Ozonation" Physical, Chemical, and Thermal Technologies, Remediation of Chlorinated and Recalcitrant Compounds, pp. 389-395, G. B. Wickramanayake and R. E. Hinchee, Eds. Battelle Press, Columbus, Ohio developed a simple model of ozone transport for a chemical subject to first-order degradation. Subsurface ozone transport is limited by ozone reaction as it moves through the soil. The importance of ozone reaction rates on ozone transport is illustrated by considering simplified radial transport of ozone from an injection well. Clayton's equation, combining the well drawdown equation with the standard first-order decay equation yields:

$$C - C_0 e^{-kt} = C_0 e^{-[k\pi H n S_g R^2/Q]}$$

This equation is an analytical solution for steady-state radial gas transport subject to first-order decay where C is ozone concentrations; $C_0$ is the initial ozone concentration; k is the degradation constant of 0.693/half-life; t is time; H is the height of flow zone; n is the soil porosity; $S_g$ is the gas saturation (the fraction of ozone gas per void volume); R is the radial distance from the spargewell; and Q is the injection rate.

The radius of influence "a" for pilot unit C-Sparge™ Kerfoot Technologies, Inc. can be approximated as:

R~6-7 meters if 5-6 m deep point
Z=6 m
O=soil porosity=0.25 (for sands)
Q=mass $O_3$/$_{mass\ air}$=12 gm/hr/5040 1/hr=0.0011 or 0.11%
$S_g$=1.0 (with continual purging, ozone/air replaces all
$\pi$=3.14
k=0.03

If Q is increased while maintaining the ratio at 0.11%, the radius increases. By coating the ozone microbubble with hydroperoxide, the half-life of supplied ozone gas is extended.

Clayton assumed 5 to 45 minutes for ozone half-life in injected vadose zones or saturated zones (Clayton, 1998). By conducting a comparison with the same model, ozone half-lives can be from 5 to 30 hours in field situations, where injection has been conducted for three weeks to six months Kerfoot, W. B. and P. LeCheminant 2003, "Ozone Microbubble Sparging at a California Site, Ch. 25 In MTBE Remediation Handbook, E. E. Moyer and P. T. Kostecki, Eds., Amherst Scientific Publishers, Amherst, Mass. This represents an improvement of 10 to 30 times the originally estimated ozone half-life.

Adjusting and maintaining molar ratio of oxidant to the organic contaminant allows for an efficient reaction without excessive unrelated products or byproducts. Petroleum spills release a complex mixture of organic compounds into soils and groundwater during dispersion. The compounds can be separated by their chemical composition, volatility, solubility, and partitioning between gas, liquid, and adsorbed phases. The efficiency of treatment by pulsed air (oxygen at 20%), ozone/air, and hydroperoxide-encapsulated oxygen/ozone can be gauged by the mass removal (decomposition) of the petroleum fraction versus the mass of oxygen supplied. The mass removal ratio can be compared to the stoichiometric ratio expected as a measure of efficiency of treatment.

The need to measure the efficiency of removal of a target chemical of concern (COC) is necessary since the mass of oxidation should be sufficient to achieve levels of aqueous and soil concentrations of classes of Response Action Outcomes consistent with risk management. With gaseous injection, the rate of removal is defined, particularly in certain states and countries (i.e., Massachusetts, The Netherlands), which require analyses of both groundwater (GW) and soil (S) for closure on a site. For evaluation purposes, the following expression is used to compare with process stoichiometric ratios:

$$EF_{ox} = \frac{\text{oxidant mass utilized}}{\Sigma(COC_e - COC_o)_{gw} + (COC_e) - COC_o)_s} = \frac{\Delta O_x}{\Delta C}$$

Where: $EF_{ox}$=oxidation efficiency
$\Delta C$=change in carbon content (gms)
$\Delta O_x$=change in oxidant delivered (or oxygen delivered) (gms)
$COC_o$=start concentration of contaminant of concern
$COC_e$=end concentration of contaminant of concern
GW=in groundwater
S=in soil sediments The advantage of such a measure is that it can be compared directly with a well-mixed, completely reacted stoichiometric ratio of treatment materials to contaminants (for example, HVOCs, BTEX, MTBE, PAHs, alkanes). In complex mixtures of petroleum spills, the form of carbon can switch from one compound to another because of reactive processes (hydroxylation, carboxylation, condensation). The use of a ratio of reduction of total organic carbon (TOC) to oxidant supplied may be better suited for measuring oxidative efficiency.

The field of wet air oxidation (WAO) has employed the concept for some time of aboveground reactors (Hao and Phull, 1994). The final representation of oxygen utilization versus carbon removal is directly convertible to carbon dioxide end product production. The following ratios (TABLE 2) have been observed during the past five years of microbubble ozone injection.

TABLE 2

Observed Oxidation Efficiencies Compared to Stoichiometric Requirements (gm$O_3$ to gmC)

| | Ozone Molar Equivalents | Gram Equivalents | Observed Oxidation Efficiency |
| --- | --- | --- | --- |
| MTBE | 5.0 | 2.7 | 3.0 |
| BTEX | 6.2 | 3.2 | 3.0-3.6 |
| Benzene | 5 | 3.07 | |
| Toluene | 6 | 3.13 | |
| Ethylbenzene | 7 | 3.16 | |
| Xylenes | 7 | 3.16 | |
| Naphthalene | 8.0 | 3.0 | 3.0 |
| TPH ($C_6$-$C_{36}$) | 8.0 | 3.4 | 1.1-1.8 |

The rapid field removal rates of MTBE seem to have a common stoichiometry, which approaches a theoretical ratio of 3 grams ozone to 1 gram MTBE, close to the 2.7 gram equivalents described by Karpel vel Leitner (1994). (See for instance, Kerfoot, "Ozone Microsparging for Rapid MTBE Removal" The Chemical Oxidation Reactive Barriers, Battelle Press Columbus Ohio (2000); Wheeler et al., "In Situ Ozone Remediation of MTBE in Groundwater" presented at The 17th Annual International Conference on Groundwater Soils and Sediments Oct. 22-25, (2001), University of Massachusetts Amherst Mass.; and Nichols et al, "Evaluation of an Ozone Air Sparging Test to Remediate Groundwater on Long Island N.Y." in Groundwater" presented at The 17th Annual International Conference on Groundwater Soils and Sediments Oct. 22-25 (2001) in University of Massachusetts Amherst Mass.) With BTEX constituents, usually the rate of removal of toluene exceeds that of benzene, xylenes, and ethylbenzene (Kerfoot, 2000) but corresponds to an oxidation efficiency of 3.0 to 3.6 grams ozone to grams COC removed.

Laminar Spargepoint®

The laminar Spargepoints® (or equivalent) are used to inject ozone and hydrogen peroxide or other liquid into the ground. The laminar Spargepoints® are made of a microporous flouropolymer material, or microporous stainless steel. As the ozone and hydrogen peroxide are pumped into the points, they are pushed out through the micro-pores, forming a hydrogen peroxide encapsulated ozone bubble. The contents of the bubble react with the contamination in the ground. Ozone may also be injected through microporous ceramic diffusers below liquid introduction by microporous or slotted screens.

Tubing

The tubing forms the connections between the C-Sparger® control panel and the hydrogen peroxide control panel to the laminar Spargepoints®. There are two types of tubing used. One is high density polyethylene or Kynar, depending upon $O_3$ concentration for the lateral runs from the control panels to the wells. The other is Teflon® in the control panels and for the hydrogen peroxide flow from the wellhead to the laminar Spargepoint®. Other types of tubing that are resistant to ozone and hydrogen peroxide can be used.

Pulsing, Siphoning, and Residence Time for Maximizing Efficiency

Adjusting downwards the size of gas bubbles allows sufficiently slow rise time to allow adequate residence time for gas/aqueous reactions to go to completion. Pulsing allows the introduction of gas bubbles, coated with liquid or surrounded by liquid (if bubble diameter is equal to or greater than capillary pore size) to be introduced, and reside in the vicinity of the compounds of concern for reaction and move upwards during the next pressure event. Rise time in saturated sands is substantially reduced by reducing the diameter of the emitted microbubbles.

If a continuous gas flow were used instead of intermittent, a continuous gas channel would be produced (as envisioned by Clayton (1998)). Interfering with liquid coating of the gas bubbles, lowering efficiency of reaction by rapidly transporting unreacted ozone gas into the vadose zone. Producing a continual gas flow (greater than 10 cfm through 0.010 inch slots, 1 meter long, 2 inches in diameter) can provide vertical gas travel times of greater than 2 meters/minute. In comparison, fine bubble production (0.5 to 50 micron size), can result in vertical travel times of 0.01 to 0.1 meters/minute. By extending the half-life of ozone from 0.5 to 30 hours, the residence time for reaction in a 6-meter vertical contaminated zone increases from 60 to 600 minutes, approaching the half-life of ozone.

Siphoning Effect

The movement of fine gas bubbles coated with liquid produces a lower pressure as the bubbles are injected out into the formation through Laminar Spargepoints®.

The higher the necessary gas pressure for operation against formation backpressure, the greater the negative pressure siphoning in liquid. This phenomenon may reflect smaller size microbubbles with higher surface to volume ratios evolving from Boyle's Law of Pressure, requiring more liquid to cover the emitted gas volume. Surface tension of the liquid would cause more liquid to be delivered.

The process adds the oxidant (e.g., ozone) to in-situ oxidize an organic compound stoichiometrically in the soil and groundwater without producing an adverse condition of Eh or pH in the formation at the endpoint. A Pourbaix diagram is a diagram that is commonly used for discussing the general relations between redox activity and Bronsted acidity. The regions mapped in the diagram indicate the conditions of pH and potential under which each molecular species is stable.

Figure 13:
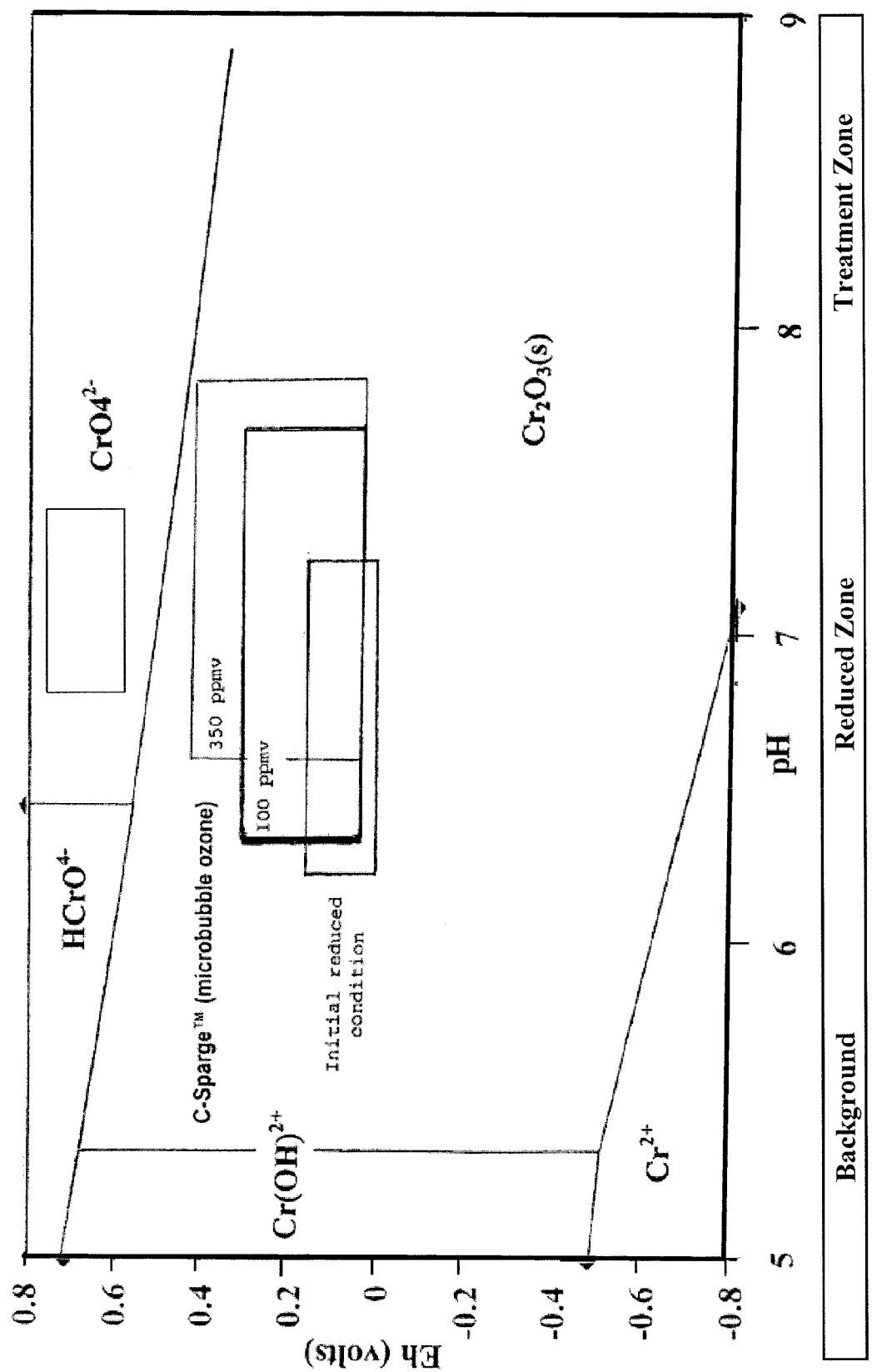
FIG. 13 is a Pourbaix diagram of chromium species with range of Eh/pH observed with ozone injector.
Figure 14:
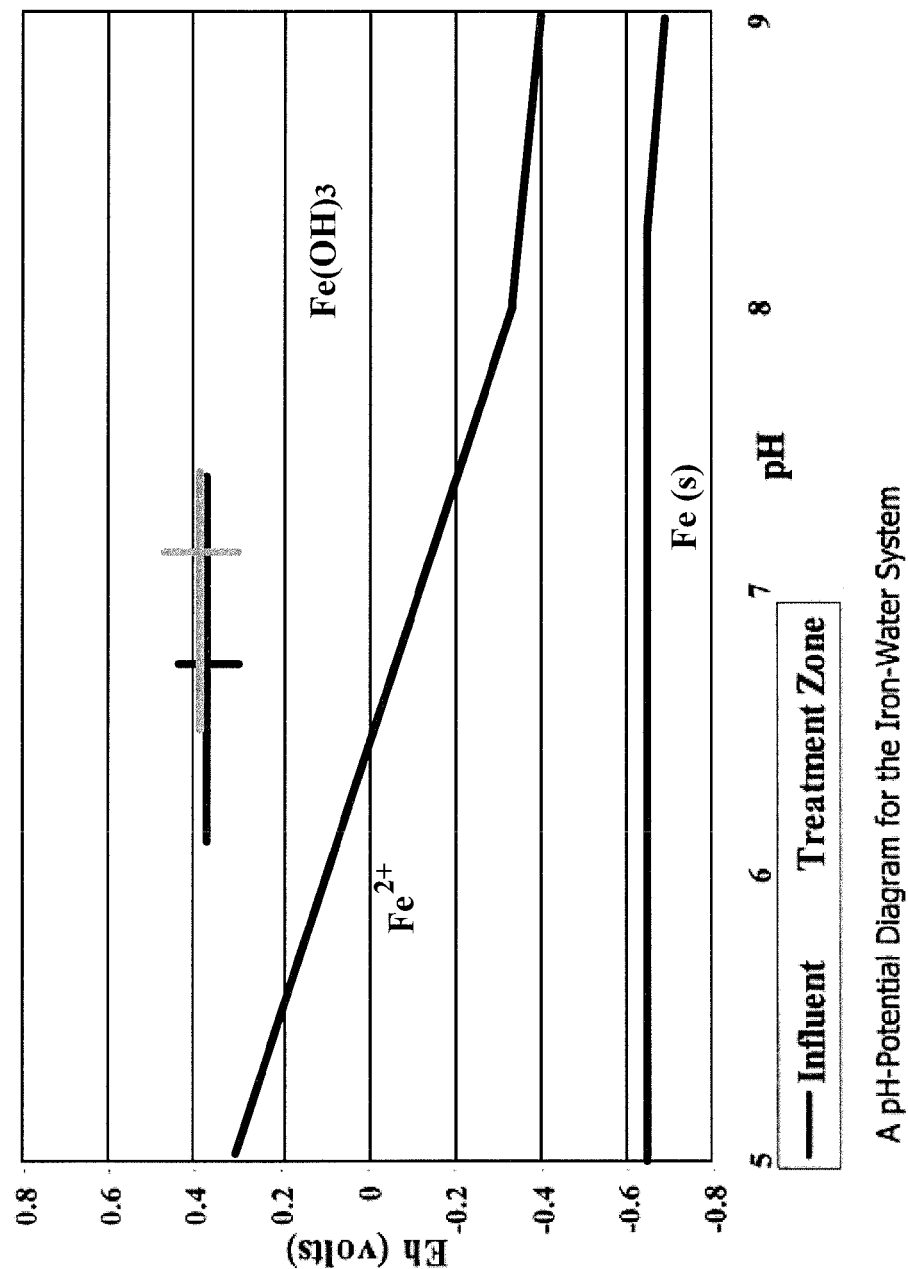
FIG. 14 is a Pourbaix diagram of iron species with range of Eh/pH observed with microbubble injector.

Pourbaix diagrams for chromium and iron species are presented in FIGS. 13 and 14. The pH changes from 6.3 to 7.8 during oxidant injection. The Eh rose from near 0 to just below 0.4 volts. As long as the Eh is maintained below 0.4 and pH is not allowed to go above 8.0, hexavalent chromium should not be produced from the trivalent species.

With iron species, the ferrous ($Fe^{2+}$) species may be completely converted to the ferric trivalent species ($Fe^{3+}$) as Fe$(OH)_3$. Even though the amount of iron species is greater than the target organic compounds, very effective removal of MTBE, BTEX, and TPH fractions occurs consistent with oxidant addition. The overall Eh and pH of the aquifer can be adjusted to the continual release of the oxidant. The changes in compound removal, Eh, and pH are capable of being reviewed on Pourbaix diagrams and adjusted as needed by varying the x, y, and z amounts of each component. A certain amount of the sorbed organics may be directly oxidized, but desorption appears to play a greater role, followed by reaction of the solubilized species. Pulsed injection of gas and liquid can reduce formation of byproducts and intermediate products. The oxidation state of the aqueous phase metals (iron, chromium) is clearly a function of the electron/proton activity.

Figure 15:
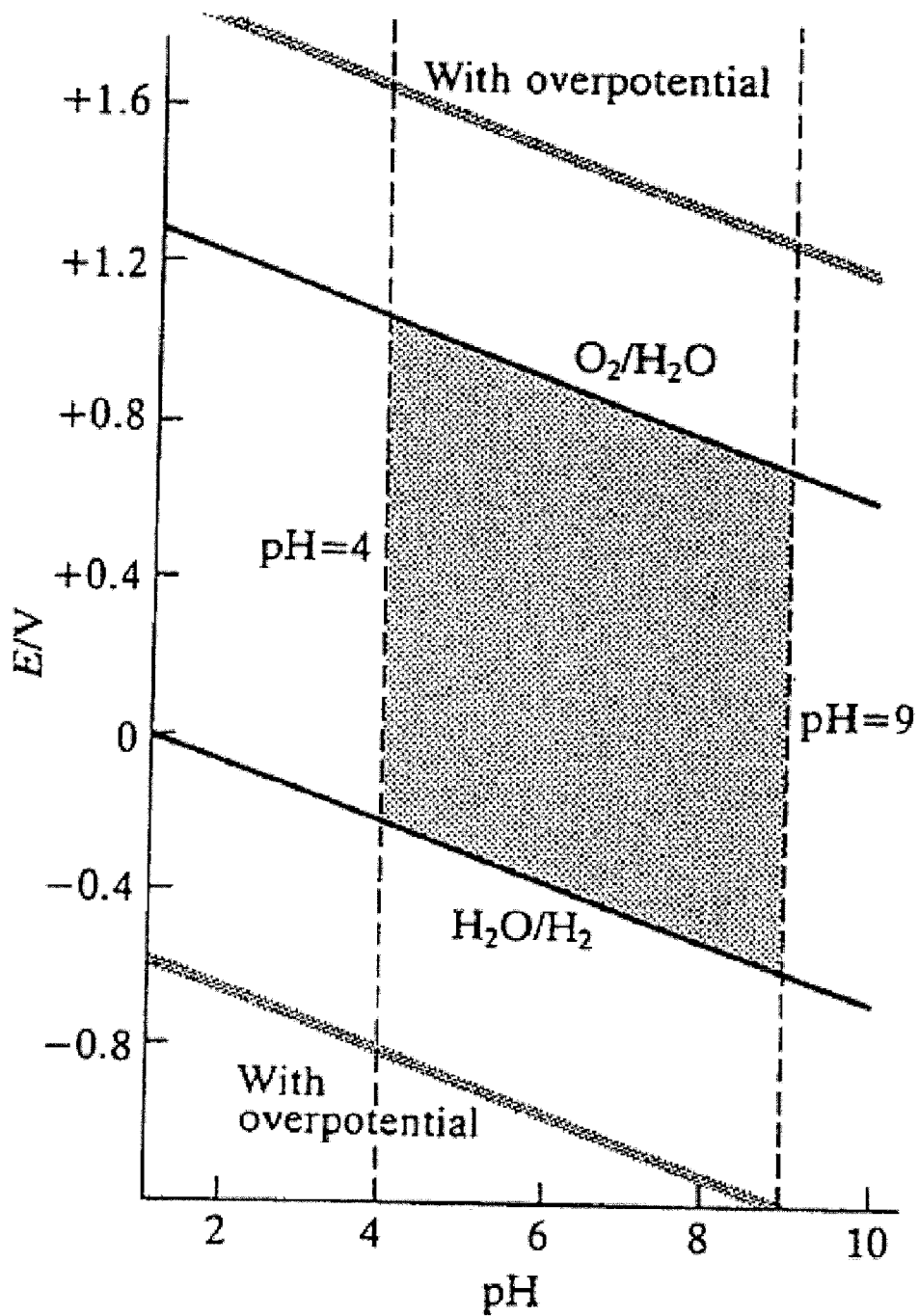
FIG. 15 is a diagram depicting stable species composition in aqueous condition.

Referring to FIG. 15, the stability field of water is shown. The vertical axis is the reduction potential of redox materials in water, with those above the upper line being capable of oxidizing water and those below being capable of reducing water. The gray lines are the boundaries when over potential is taken into consideration, and the broken vertical lines represent the normal pH range for natural waters. The gray area is the stability field for natural waters.

Example Compounds

The following compounds have shown to be good examples for ozone and Perozone™ treatment: gasoline and fuel oil spills, including MTBE, TBA, BTEX, naphthalenes, PAHs (polyaromatic hydrocarbons), and TPH (alkanes and alkenes). Secondly, the wood preservatives, pentachlorophenol (PCP), tetrachlorophenol (TCP), and Stoddard solvent have shown effective removal.

Transuranic Compounds

In addition to the removal of the previously-mentioned organic compounds, certain transuranic compounds (radioactive species) may be soluble at low Eh and pH ranges. By adjusting the Eh and pH to oxidized conditions, Eh>1 volts, and pH>4.0, plutonium species may be precipitated on-site. The production of oxidative zones in barrier lines may be capable of limiting migration of the transuranics in the aquifer.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprises:
   a mechanism to deliver oxidant and fluid to a diffuser;
   a diffuser that allows delivery of the oxidant and the fluid to a soil formation, with one of the oxidant and fluid forming a coating over the other of the oxidant and fluid; and
   a controller responsive to a signal that corresponds to a determined oxidation potential of the soil formation, to produce a signal that couples to the diffuser a source of oxidant selected from a plurality of sources of oxidant of differing oxidation potential, to adjust and maintain a selected molar ratio of oxidant to contaminant present in the soil formation.

2. The apparatus of claim 1 comprising an ozone generator and wherein the oxidant is ozone.

3. The apparatus of claim 2 wherein the ozone is delivered to the diffuser, which is a microporous diffuser, and the ozone is delivered in a molar ratio that is varied according to the output signal from the controller.

4. The apparatus of claim 2 wherein the diffuser is a microporous diffuser that has a porosity characteristic that permits bubbles of 0.3-200 microns diameter to be released into the surrounding formation.

5. The apparatus of claim 1 further comprising:
the plurality of sources of oxidant of different oxidation potential to provide the oxidant.

6. The apparatus of claim 5 further comprising:
a manifold coupled to the plural sources and the diffuser and controlled by the controller to select one of the sources.

7. The apparatus of claim 1 wherein the oxidants include, oxygen, ozone, a hydroperoxide that is a substantial byproduct of reactions with the oxidant and the contaminants, formic peracid, hydromethyl hydroperoxide, hydrogen peroxide, sodium permanganate, and potassium permanganate.

8. The apparatus of claim 1 wherein the oxidants include, oxygen, ozone, and hydrogen peroxide.

9. The apparatus of claim 1 further comprising:
a well having a casing with an inlet screen and outlet screen to promote a recirculation of water into the casing and through surrounding ground area, with the diffuser disposed in the well.

10. The apparatus of claim 1 wherein controlling the oxidation potential allows for an efficient reaction without excessive unrelated products or byproducts.

11. The apparatus of claim 1 wherein the mechanism includes an air pump to deliver a gaseous oxidant to the diffuser.

12. An apparatus, comprises:
a microporous diffuser;
a mechanism to deliver an oxidant or a reductant to the microporous diffuser; and
a controller responsive to a signal that corresponds to a determined oxidation-reduction potential of the soil formation to select oxidant or reductant to deliver to the microporous diffuser to adjust a molar ratio of the oxidant or reductant to contaminant present in the soil formation.

13. The apparatus of claim 12 wherein the reductant is hydrogen.

14. The apparatus of claim 12 wherein the reductant is nitrogen-diluted hydrogen.

15. The apparatus of claim 12 wherein the reductant is hydrogen sulfide.

16. The apparatus of claim 12 wherein the reductant is a liquid and is used to form a coaling on bubbles from the microporous diffuser.

17. The apparatus of claim 12 wherein the reductant includes hydrogen gas and dithiosulphite liquid and is used to form a coating on bubbles of hydrogen gas from the microporous diffuser.

18. The apparatus of claim 12 wherein the reductant is lactate and is used to form a coating on bubbles from the microporous diffuser.

19. The apparatus of claim 12 wherein the reductant is nitrogen-diluted hydrogen and dithiosulphite liquid that is used to form a coating on bubbles from the microporous diffuser.

20. The apparatus of claim 12 further comprising:
a well having a casing with an inlet screen and outlet screen to promote a recirculation of water into the casing and through surrounding ground area, with the diffuser disposed in the well.

21. The apparatus of claim 12 further comprising:
a second microporous diffuser located below a liquid injection screen, the second microporous diffuser releasing microbubbles and the screen releasing liquid through which the microbubbles will pass to coat the microbubbles with the liquid.

22. An apparatus comprises:
a first mechanism to deliver an oxidant;
a second mechanism to deliver a liquid;
a first microporous diffuser coupled to the first and second mechanisms that allows delivery of the oxidant and the liquid to a soil formation, with the liquid forming a coating over the oxidant;
a second microporous diffuser coupled to the first and second mechanisms that allows delivery of the oxidant to the soil formation, with the second microporous diffuser arranged in the soil formation relative to the first microporous diffuser, to allow the second microporous diffuser to release oxidant under the liquid coated oxidant; and
a controller responsive to a signal that corresponds to a determined oxidation potential of the soil formation to adjust and maintain a selected molar ratio of oxidant to contaminant present in the soil formation.

23. The apparatus of claim 22 comprising an ozone generator and wherein the oxidant is ozone.

24. The apparatus of claim 23 wherein the ozone is delivered in a molar ratio that is varied in accordance with an output signal from the controller.

25. The apparatus of claim 22 wherein the microporous diffusers have a porosity characteristic that permits bubbles of 0.3-200 microns diameter to be released into the surrounding formation.

26. The apparatus of claim 22 further comprising:
a plurality of sources of oxidant of different oxidation potentials to provide the oxidant; and
the controller is responsive to the signal that corresponds to a determined oxidation potential of the site, and further includes circuitry to select one of the sources of oxidant to deliver to the diffuser to adjust and maintain the selected molar ratio of oxidant to contaminant present in the site.

27. The apparatus of claim 22 wherein the oxidants include, oxygen. ozone, a hydroperoxide that is a substantial byproduct of reactions with the oxidant and the contaminants, and hydrogen peroxide or sodium permanganate.

28. The apparatus of claim 22 wherein the oxidants include, oxygen, ozone, and hydrogen peroxide.

29. The apparatus of claim 22 further comprising:
a well having a casing with an inlet screen and outlet screen to promote a recirculation of water into the casing and through surrounding ground area, with the first diffuser disposed in the well and with the well having a borehole that is disposed beneath the length of the casing and with the second microporous diffuser disposed in the borehole.

30. The apparatus of claim 22 wherein sources of a reducing agent are coupled to either or both of the first mechanism and the second mechanism; and
    the controller causes the first and/or second mechanisms to deliver the reducing agent or agents to the first and/or second microporous diffusers in response to receiving a signal indication that the surrounding soil formation has an oxidation potential that exceeds a threshold.

31. The apparatus of claim 22 wherein the mechanism includes an air pump to deliver a gaseous oxidant to the first microporous diffuser and second microporous diffuser.

32. The apparatus of claim 22 further comprising at least one sensor that produces a signal related to determined oxidation potential.

33. The apparatus of claim 22 further comprising at least one sensor that produces a signal related to determined oxidation potential, the sensor disposed in a monitoring well in the radius of influence of the apparatus.

34. An apparatus comprising:
    a first mechanism to deliver a reductant;
    a second mechanism to deliver a liquid;
    a first microporous diffuser coupled to the first and second mechanisms that allows delivery of the reductant and liquid to a soil formation with the liquid forming a coating over the reductant;
    a second microporous diffuser coupled to the first and second mechanisms that allows delivery of the reductant to the soil formation with the second microporous diffuser to release reductant under the liquid-coated reductant; and
    a controller responsive to a signal that corresponds to a determined oxidation potential of the soil formation to adjust and maintain a selected molar ratio of reductant to contaminant present in the soil formation.

35. The apparatus of claim 34 further comprising:
    a nitrogen generator and wherein the reductant is hydrogen gas that is diluted with nitrogen gas.

36. The apparatus of claim 34 further comprising:
    a nitrogen generator and wherein the reductant is lactate solution diluted with nitrogen gas.

37. The apparatus of claim 34 wherein the reductant is hydrogen sulfide gas.

38. The apparatus of claim 34 wherein the reductant is sodium dithionate.

39. The apparatus of claim 34 wherein the reductant is sulfur dioxide.

40. The apparatus of claim 34 further comprising at least one sensor that produces a signal related to determined oxidation potential.

41. The apparatus of claim 34 further comprising at least one sensor that produces a signal related to determined oxidation potential, the sensor disposed in a monitoring well in the radius of influence of the apparatus.

* * * * *